United States Patent
Yokozeki et al.

(10) Patent No.: US 10,516,821 B2
(45) Date of Patent: Dec. 24, 2019

(54) FOCUS DETECTION APPARATUS AND CONTROL METHOD THEREFOR

(71) Applicant: CANON KABUSHIKI KAISHA, Tokyo (JP)

(72) Inventors: Makoto Yokozeki, Yokohama (JP); Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/376,559

(22) Filed: Apr. 5, 2019

(65) Prior Publication Data

US 2019/0238745 A1    Aug. 1, 2019

Related U.S. Application Data

(63) Continuation of application No. 15/083,697, filed on Mar. 29, 2016, now Pat. No. 10,306,131.

(30) Foreign Application Priority Data

Apr. 3, 2015 (JP) ................................. 2015-077146
Apr. 3, 2015 (JP) ................................. 2015-077205

(51) Int. Cl.
    *H04N 5/232*      (2006.01)

(52) U.S. Cl.
    CPC ..... *H04N 5/23212* (2013.01); *H04N 5/23219* (2013.01); *H04N 5/23293* (2013.01)

(58) Field of Classification Search
    CPC ........... H04N 5/23212; H04N 5/23219; H04N 5/23293
See application file for complete search history.

(56) References Cited

U.S. PATENT DOCUMENTS

| | | | | |
|---|---|---|---|---|
| 2007/0285528 A1* | 12/2007 | Mise | .................. | H04N 5/23212 348/222.1 |
| 2008/0278587 A1* | 11/2008 | Izawa | ..................... | G02B 7/36 348/207.11 |
| 2012/0147252 A1* | 6/2012 | Kunishige | .......... | H04N 5/23212 348/345 |

\* cited by examiner

*Primary Examiner* — Twyler L Haskins
*Assistant Examiner* — Angel L Garces-Rivera
(74) *Attorney, Agent, or Firm* — Canon U.S.A., Inc. I.P. Division

(57) ABSTRACT

A focus detection apparatus includes an image pickup unit configured to perform photoelectric conversion on a luminous flux having passed through an imaging optical system, a focus detection unit configured to detect a focusing state based on a signal generated by the image pickup unit, a setting unit configured to set a first region within an image generated by the image pickup unit, a display controller configured to control such that an index representing the focusing state detected by the focus detection unit within the first region can be superimposed on the image, and an obtaining unit configured to obtain information regarding a predetermined subject in the image. In this case, the setting unit sets a position of the first region based on information regarding at least one of a position, a size, and a direction of the predetermined subject in the image.

17 Claims, 19 Drawing Sheets

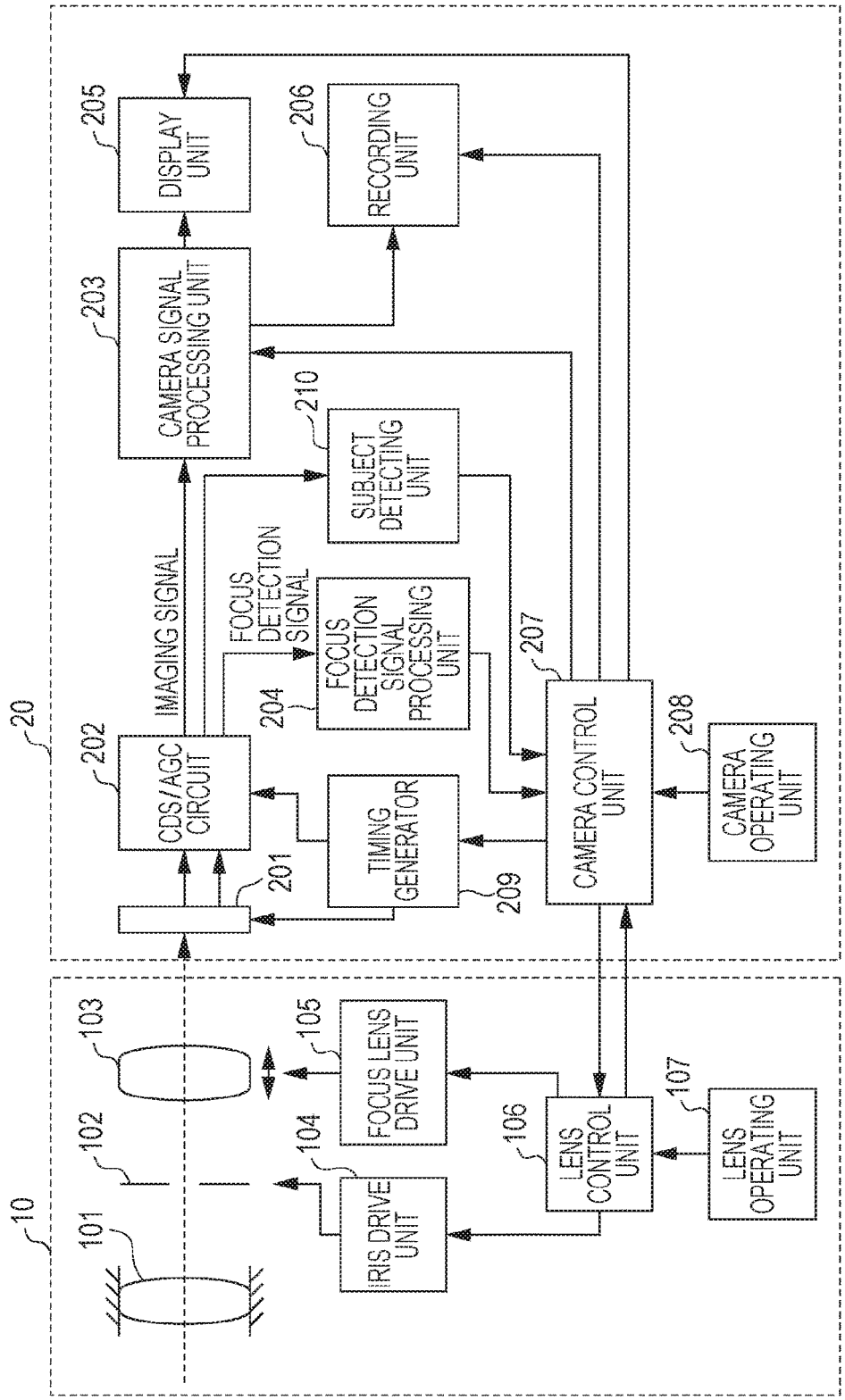

| R | Gr | R | Gr | R | Gr | R | Gr | R | Gr |
|---|----|---|----|---|----|---|----|---|----|
| Gb | B | Gb | B | Gb | B | Gb | B | Gb | B |

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

FIG. 5A
FIG. 5B
FIG. 5C
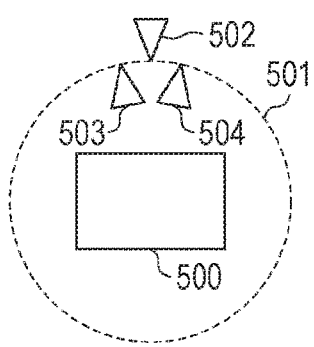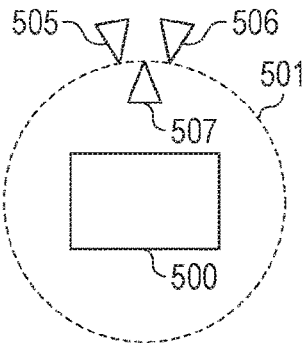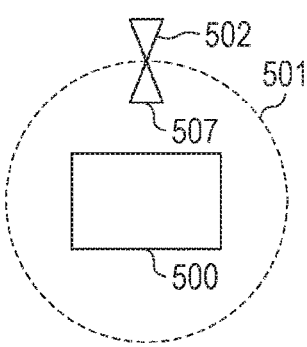
FIG. 6
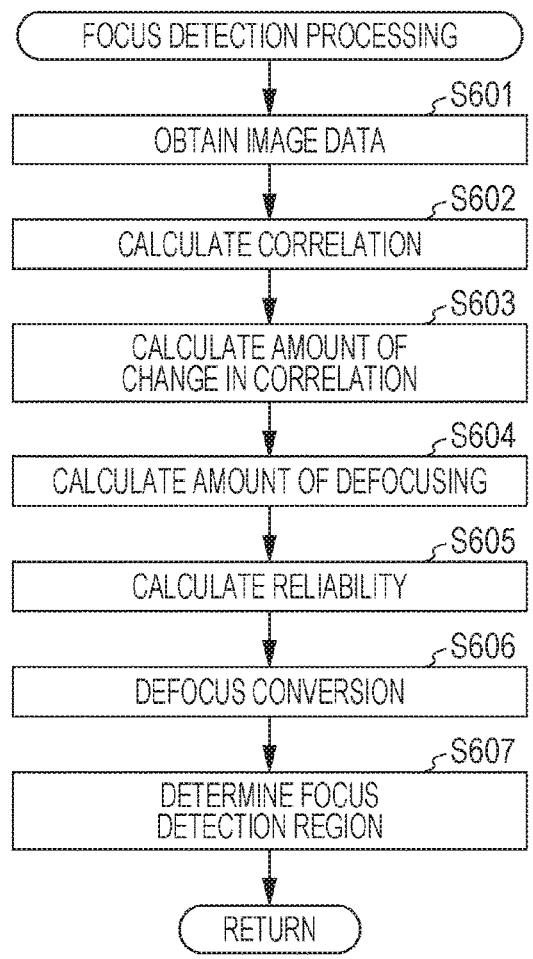

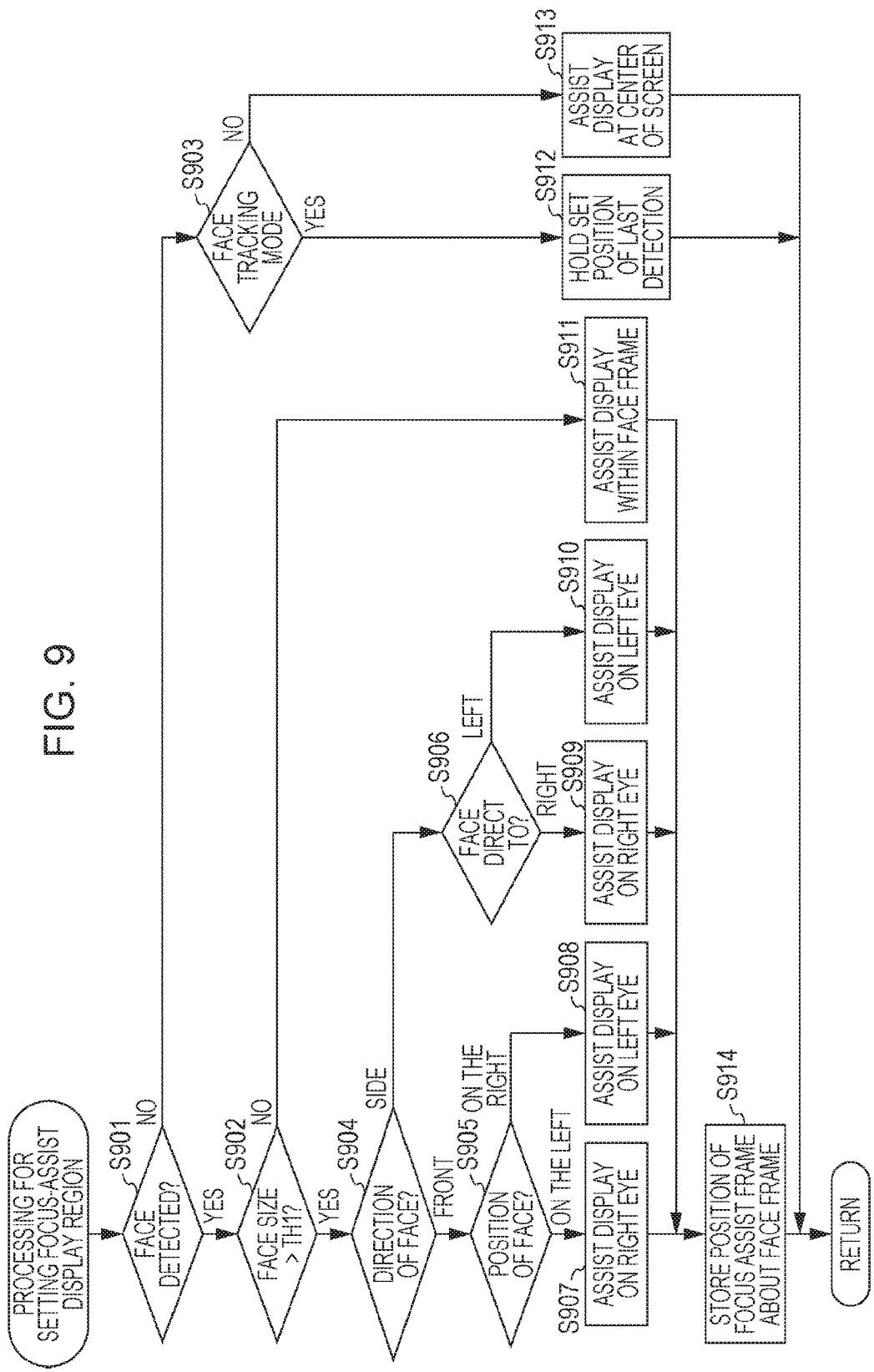

FIG. 14A
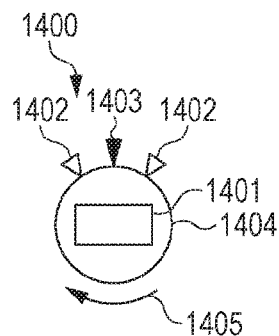
FIG. 14B
| FOCUSED STATE | LARGE BLURRING | SMALL BLURRING | FOCUSED | DIRECTION ONLY | FOCUS DETECTION IS INVALID |
|---|---|---|---|---|---|
| DISPLAY EXAMPLE | θ1 | θ2 | 1404 | | |
FIG. 14C
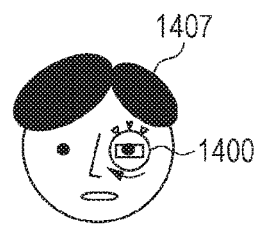

FIG. 15

| | MANUAL MOVEMENT | | | AUTOMATIC MOVEMENT |
|---|---|---|---|---|
| | NO MOVEMENT OVERLAP REGION: 100 - 80% | SMALL MOVEMENT (LOW SPEED) OVERLAP REGION: 80 - 50% | LARGE MOVEMENT (HIGH SPEED) OVERLAP REGION: 50 - 0% | WHEN SUBJECT IS DETECTED |
| TYPES OF DISPLAY | •ANGLE (AMOUNT OF DEFOCUSING) •DIRECTION | •ANGLE (AMOUNT OF DEFOCUSING) •DIRECTION | •DIRECTION | •ANGLE (AMOUNT OF DEFOCUSING) •DIRECTION |
| AVERAGE NUMBER OF TIMES | 10 | 5 | 0 | 0 |
| DISPLAY EXAMPLES | | | | |
| FOCUS DETECTION REGION | SET FOCUS DETECTION REGION ONLY | SET FOCUS DETECTION REGION ONLY | SET FOCUS DETECTION REGION ONLY | ADDITIONALLY SET A PLURALITY OF REGIONS ON SUBJECT IN ADDITION TO SET FOCUS DETECTION REGION |

FOCUS DETECTION APPARATUS AND CONTROL METHOD THEREFOR

CROSS-REFERENCE TO RELATED APPLICATIONS

This application is a Continuation, and claims the benefit, of U.S. patent application Ser. No. 15/083,697, filed Mar. 29, 2016 (now U.S. Pat. No. 10,306,131), which claims priority from Japanese Patent Application No. 2015-077205, filed Apr. 3, 2015, and Japanese Patent Application No. 2015-077146, filed Apr. 3, 2015. Each of U.S. patent application Ser. No. 15/083,697, Japanese Patent Application No. 2015-077205, and Japanese Patent Application No. 2015-077146 is hereby incorporated by reference herein in its entirety.

BACKGROUND OF THE INVENTION

Field of the Invention

The present invention relates to a focus detection apparatus including a configuration for detecting a focusing state and a configuration for controlling an indication of a focusing state.

Description of the Related Art

With a high definition camcorder supporting full high definition or 4K video capture, it is not easy for a photographer to implement precise focus adjustment by performing a manual focus operation (hereinafter, called an MF operation) on a subject. Particularly when a focus adjustment is performed by checking focusing on a viewfinder or a panel, for example, defocusing may occur which cannot be found on the viewfinder or panel, for example.

In order to solve this problem, an apparatus has been known which has a function for displaying an enlarged image of a part of the field of view on a liquid crystal display. Japanese Patent Laid-Open No. 2012-186670 proposes a method for identifying the position of a feature part included in a subject image through an image analysis process and displaying an enlarged image of the feature part at the identified position on a liquid crystal display in a case where a criterion for enlarged display is not registered. More specifically, in a case where one human figure is a subject, images of both eyes of the human figure are enlarged and are displayed simultaneously. In a case where a plurality of human figures are subjects, images of face parts of all of the human figures are enlarged and are displayed simultaneously.

However, according to Japanese Patent Laid-Open No. 2012-186670, the in-focus direction is not recognized from the enlarged image, and because an MF operation is performed by checking the enlarged image, there may be a possibility that the focus lens may be moved by passing through the in-focus position unintentionally.

Japanese Patent Laid-Open No. 2007-279334 discloses a configuration including a main imaging part and sub-imaging parts for front focus evaluation and back focus evaluation, wherein an in-focus state marker indicative of the in-focus direction is displayed as a result of calculation of the in focus levels of the front focus state and the back focus state. Japanese Patent Laid-Open No. 2007-248615 proposes a method for displaying a bar indicative of a degree of in-focus as a result of calculation of an in-focus evaluation value during an MF operation. Japanese Patent Laid-Open No. 2005-140943 proposes a focus assist method in an imaging apparatus for displaying a plurality of indicators indicative of a change in focusing state caused by a move of a focus lens. Japanese Patent Laid-Open No. 2009-122593 proposes a method for changing a display period of an indicator of a focusing state in accordance with the operation performed on a focus lens.

Displaying the in-focus state marker disclosed in Japanese Patent Laid-Open No. 2007-279334 for each of all feature portions as in Japanese Patent Laid-Open No. 2012-186670 may complicate the resulting image as well as an increase in calculation load. Accordingly, selection of an image region for displaying an in-focus state marker may be expected. However, Japanese Patent Laid-Open No. 2012-186670 does not disclose how an image region for displaying an in-focus state marker is to be set in accordance with a subject. It does not disclose a method for changing the image region for displaying an in-focus state marker in accordance with a user operation.

SUMMARY OF THE INVENTION

The present invention provides a function of indicating a focusing state, wherein the indication of the focusing state can be displayed on a proper image region according to the state of a subject.

According to an aspect of the present invention, there is provided a focus detection apparatus including an image pickup unit configured to perform photoelectric conversion on a luminous flux having passed through an imaging optical system, a focus detection unit configured to detect a focusing state based on a signal generated by the image pickup unit, a setting unit configured to set a first region within an image generated by the image pickup unit, a display controller configured to control such that an index representing the focusing state detected by the focus detection unit within the first region can be superimposed on the image, and an obtaining unit configured to obtain information regarding a predetermined subject in the image, wherein the setting unit sets a position of the first region based on information regarding at least one of a position, a size, and a direction of the predetermined subject in the image.

Further features of the present invention will become apparent from the following description of exemplary embodiments with reference to the attached drawings.

BRIEF DESCRIPTION OF THE DRAWINGS

FIG. 1 is a block diagram illustrating configurations of a camera and a lens unit according to an exemplary embodiment.

FIGS. 5A to 5C illustrate forms of focus assist display according to an exemplary embodiment.

FIG. 6 is a flowchart illustrating focus detection processing according to an exemplary embodiment.

FIG. 9 is a flowchart illustrating processing for setting a focus assist display region according to a first exemplary embodiment.

FIGS. 14A to 14C illustrate examples of focus assist displays according to an exemplary embodiment.

FIG. 15 illustrates a relationship between moving amount of a focus detection region and focus assist display according to an exemplary embodiment.

DESCRIPTION OF THE EMBODIMENTS

Figures 2A, 2B, 3:
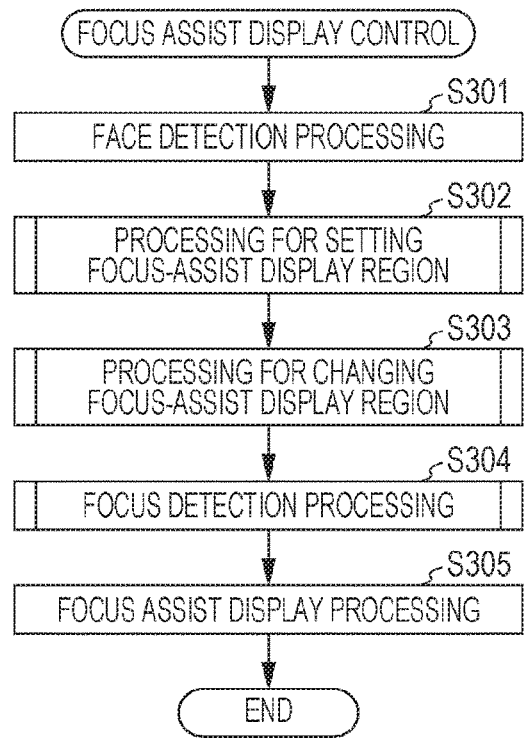
FIGS. 2A and 2B illustrate pixel configurations according to an exemplary embodiment.
FIG. 3 is a flowchart illustrating processing for controlling display of a focus assist frame according to an exemplary embodiment.

Exemplary embodiments of the present invention will be described below in detail with reference to the attached drawings. The following embodiments are given only for purpose of illustration of implementation of the present invention, and it should be understood that the present invention is limited to the following embodiments.

First Exemplary Embodiment

FIG. 1 is a block diagram illustrating a configuration of an interchangeable-lens camera including a lens unit and a camera main body according to a first exemplary embodiment. As illustrated in FIG. 1, a camera system according to this exemplary embodiment includes a lens unit 10 and a camera main body 20. A lens control unit 106 configured to generally control operations of the whole lens unit 10 and a camera control unit 207 configured to generally control the whole camera communicate data with each other. According to this exemplary embodiment, an interchangeable-lens camera will be described as an example. However, the present invention is applicable to a camera integrated with a lens.

A configuration of the lens unit 10 will be described first. The lens unit 10 has an imaging optical system including a fixed lens 101, an iris 102, a focus lens 103, and a zoom lens (not illustrated). The iris 102 is driven by an iris drive unit 104 and is configured to control the quantity of light incident on an image sensing element 201, which will be described below. The focus lens 103 is driven by a focus lens drive unit 105 and is configured to perform focus adjustment. The zoom lens, not illustrated, is driven by a zoom lens drive unit to perform adjustment of zooming. According to this exemplary embodiment, the zoom lens and the zoom lens drive unit are not required components.

The iris drive unit 104, focus lens drive unit 105, and zoom lens drive unit are controlled by a lens control unit 106, and the open area amount of the iris 102 and the positions of the focus lens 103 and zoom lens are determined. When a user performs an operation of focusing or zooming through the lens operating unit 107, the lens control unit 106 executes a control based on the user operation. According to this exemplary embodiment, a user may move the focus lens 103 through the lens operating unit 107 so that manual focus adjustment operation (hereinafter, called an MF operation) can be performed.

The lens control unit 106 controls the iris drive unit 104, the focus lens drive unit 105, and the zoom lens drive unit in accordance with control instructions and control information received from a camera control unit 207, which will be described below, and transmits lens information to the camera control unit 207.

Next, a configuration of the camera main body 20 including a focus detection apparatus according to this exemplary embodiment will be described. The camera main body 20 is configured to be capable of generating an image pickup signal from a luminous flux having passed through the imaging optical system in the lens unit 10. The image sensing element 201 may be a CCD or CMOS sensor. A luminous flux having passed through the imaging optical system focuses on a light receiving surface of the image sensing element 201, and the formed subject image is converted to electric charges corresponding to the quantity of incident light by photodiodes (photoelectric conversion). The electric charges accumulated in the photodiodes are sequentially read from the image sensing element 201 as a voltage signal corresponding to the electric charges based on a driving pulse given from a timing generator 209 in accordance with a command from the camera control unit 207.

An image sensing element which does not support image plane phase difference detection for focus detection may have a Bayer pattern pixel configuration as illustrated in FIG. 2A, for example. On the other hand, the image sensing element 201 according to this exemplary embodiment hold a plurality of (two in this exemplary embodiment) photodiodes in one pixel as illustrated in FIG. 2B in order to implement image plane phase difference detection for focus detection. A luminous flux is demultiplexed by the microlens and is focused by the two photodiodes so that two signals for image pickup and focus detection can be obtained. A signal (A+B) acquired by adding the signals of the two photodiodes is an image pickup signal, and the signals (A, B) of the photodiodes are two image signals for focus detection. According to this exemplary embodiment, the method for obtaining the two image signals is not limited to the configuration for reading out the two image signals. For example, in consideration of a processing load, the added signal (A+B) and one image signal (such as A) may be read out, and the other image signal (such as B) may be acquired from a difference between the added signal (A+B) and the one image signal (such as A). A focus detection signal processing unit 204, which will be described below, performs correlation computation on the two image signals for focus detection to calculate image defocus amount and reliability information.

According to this exemplary embodiment, one pixel has two photodiodes. However, the number of photodiodes is not limited to two, but more photodiodes may be provided therein. A plurality of pixels having light-receiving sections having apertures at different positions with respect to a microlens. In other words, two signals, such as an A image signal and a B image signal, for detection of a phase difference may only be required as a result. An image sensing element supporting focus detection based on image plane phase difference detection may include a pixel for focus detection, without limiting to the configuration in which a plurality of photodiodes are provided in one pixel as in this exemplary embodiment.

The image pickup signal and the signal for focus detection (hereinafter, also called a focus detection signal) read out from the image sensing element 201 are input to a CDS (correlated double sampling)/AGC (automatic gain control) converter 202 and undergo correlated double sampling for removal of reset noise, gain adjustment, and signal digitization. The CDS/AGC converter 202 outputs the image pickup signal to a camera signal processing unit 203 and a subject detecting unit 210 and the signal for focus detection based on image plane phase difference detection to the focus detection signal processing unit 204.

The camera signal processing unit 203 transmits the image pickup signal output from the CDS/AGC converter 202 to a display unit 205. The display unit 205 is a display device which may be configured by a liquid crystal display (LCD) or an organic electroluminescence (EL) display, for example, and displays an image based on an image pickup signal. In a mode for recording an image pickup signal, the image pickup signal is recorded in a recording unit 206.

The focus detection signal processing unit 204 performs correlation computation based on two image signals for focus detection output from the CDS/AGC converter 202 to calculate an image defocus amount and reliability information (such as a matching degree of two images, a steeping degree of two images, contrast information, saturation information, and defect information). The calculated image defocus amount and reliability information are output to the camera control unit 207. Details of the correlation computation will be described below with reference to FIGS. 7A to 7C and FIGS. 8A to 8D.

This exemplary embodiment is configured such that a focus assist indicator is displayed on the display unit 205 in an MF mode in which focus adjustment is implemented by performing an MF operation. The focus assist indicator represents a focusing state within a focus assist frame superimposed on an image. The focusing state within the focus assist frame is detected based on a result of the correlation computation performed by the focus detection signal processing unit 204. A user can visually recognize information regarding a defocus amount and a defocus direction from the focus assist display to perform an MF operation intended by the user. Details of the focus assist display will be described below. On the other hand, in an AF mode in which focus adjustment is implemented automatically, focus adjustment is implemented by using a result of a correlation computation performed by the focus detection signal processing unit 204. In the AF mode, an AF frame indicating a region for obtaining a signal for performing focus adjustment is superimposed on an image, and focus assist display is not performed.

The camera control unit 207 performs controls by exchanging information with components within the camera main body 20. The camera control unit 207 may not only perform processing within the camera main body 20 but also implement a camera function operated by a user in accordance with an input from the camera operating unit 208, such as powering ON/OFF, a setting change, a recording start, start of focus detection control, checking a recorded image, and selection of a focus detection frame. As described above, the camera control unit 207 exchanges information with the lens control unit 106 within the lens unit 10 and transmits a control instruction and control information for the imaging optical system and obtains information regarding the internal configuration of the lens unit.

The subject detecting unit 210 is a block related to detection such as a face detection and a human body detection, and performs a publicly known detection process on an image pickup signal output from the CDS/AGC converter 202 and detects a specific subject region within an imaging screen. In other words, the subject detecting unit 210 is configured to detect a predetermined subject from an image pickup signal. A publicly known method may be used for the face detection, and detail descriptions will be omitted.

Focus Assist Frame Display Control as a Whole

Next, a sequence of a whole focus assist display control to be performed by the camera control unit 207 will be described with reference to FIG. 3. The processing illustrated in FIG. 3 is executed periodically based on an operation cycle of the camera.

First of all, in step S301, the camera control unit 207 instructs the subject detecting unit 210 to detect a specific subject region within an imaging screen. An example in which a region of the face of a human figure is set as the specific subject region will be described according to this exemplary embodiment.

Next, in step S302, the camera control unit 207 performs processing for setting a region for focus assist display (hereinafter, called a focus assist display region or a focus assist frame). The focus assist display region corresponds to a range (focus detection range) in which correlation computation is performed by the focus detection signal processing unit 204 in focus detection processing, which will be described below. In other words, the processing for setting a focus assist display region can also be processing for setting the focus detection range. Details of the processing for setting a focus assist display region will be described below with reference to FIG. 9.

Next, in step S303, the camera control unit 207 performs processing for changing the position of the focus assist frame in accordance with an operation performed by a user. Details of the processing for changing the focus assist display region will be described below with reference to FIG. 13.

Next, in step S304, the focus detection signal processing unit 204 performs focus detection processing in the focus detection range corresponding to the focus assist frame set in step S302. Details of the focus detection processing will be described below with reference to FIG. 6.

Next, in step S305, the camera control unit 207 performs processing for displaying the focus assist frame on the display unit 205 and stops the focus assist display control.

According to this exemplary embodiment, the focus assist display control is executable in the MF mode and is not executed in the AF mode.

Processing for Setting Focus Detection Region

Next, processing for setting a region on which the focus detection processing is performed in step S304 will be described with reference to FIGS. 4A to 4E. FIGS. 4A to 4E illustrate an example of a region for obtaining an image signal to be used for the focus detection processing.

Figure 4A:
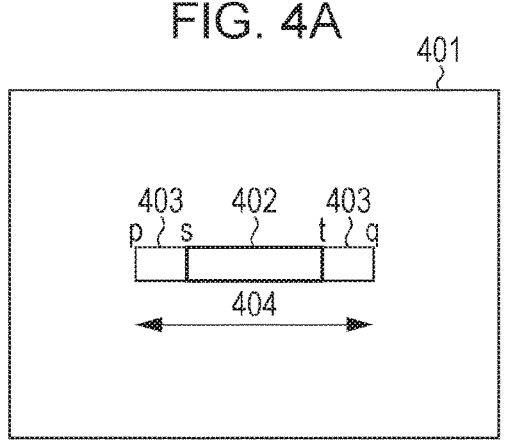
FIGS. 4A to 4E illustrate a focus detection region according to an exemplary embodiment.

FIG. 4A illustrates a focus detection range 402 on a pixel array 401. The region 404 necessary for implementing correlation computation includes the focus detection range 402 and a shift region 403 necessary for correlation computation. FIG. 4A illustrates coordinates p, q, s, and t in the x-axis direction. The region 404 is from the coordinate p to the coordinate q, and the focus detection range 402 is from the coordinate s to the coordinate t.

Figure 4B:
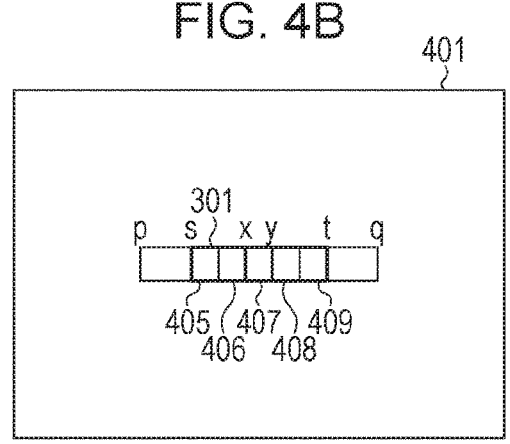

FIG. 4B illustrates focus detection regions 405 to 409 acquired by dividing the focus detection range 402 into five. As an example, an amount of focus shift is calculated for each focus detection region for performing a focus detection according to this exemplary embodiment. According to this exemplary embodiment, a focus detection result based on a most reliable region from the plurality of divided focus detection regions, and the amount of focus shift calculated from the region is used for focus assist display. It should be noted that the number and direction of divisions of a focus detection range is not limited thereto.

Figure 4C:
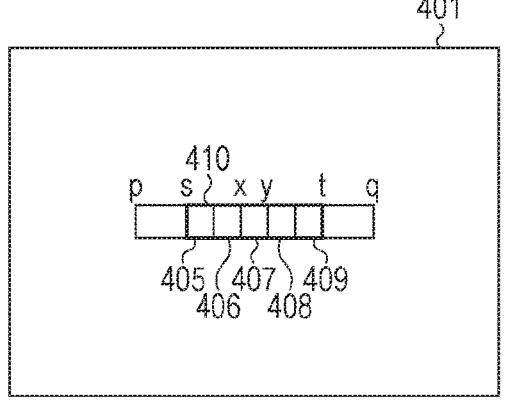

FIG. 4C illustrates a temporary focus detection region 410 connecting the focus detection regions 405 to 409 in FIG. 4B. As an example of this exemplary embodiment, an amount of focus shift calculated from the region connecting focus detection regions may be used for focus assist display.

Figure 4D:
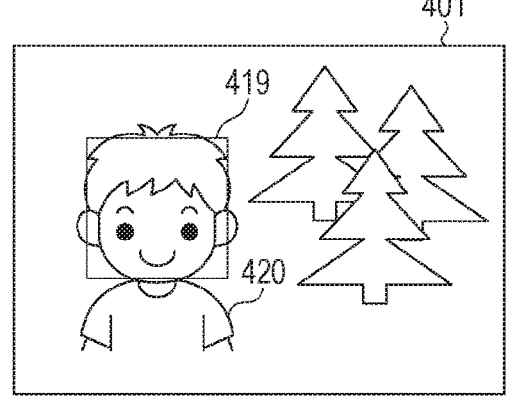

In a camera supporting a subject detection function, a focus detection region 419 can be set at a position of the detected face 420, as illustrated in FIG. 4D. In this case, one or a plurality of focus detection regions 419 are set for the detected face 420, and one valid defocus amount and one valid defocus direction are calculated from a focus detection result obtained from the set focus detection region. The valid defocus amount and/or the valid defocus direction may be used for focus assist display.

Figure 4E:
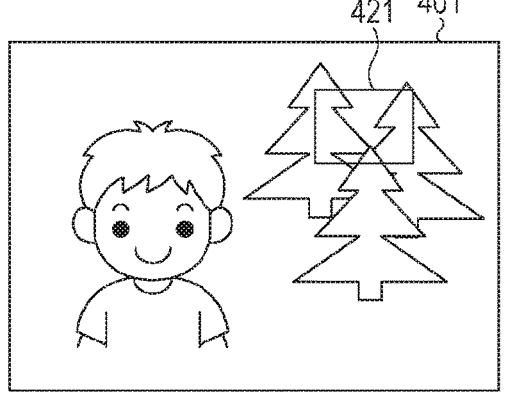

In an imaging apparatus supporting a touch input, for example, a focus detection region may be set freely in accordance with a designation by a user. As illustrated in FIG. 4E, a focus detection region may be set at a designated position 421.

The method for determining the position and the width of a focus detection region is not limited to details described according to this exemplary embodiment but may changed or modified without departing from the scope and spirit of the present invention.

Display Forms of Focus Assist Frame

Next, display forms of focus assist frame according to this exemplary embodiment will be described with reference to FIGS. 5A to 5C. FIGS. 5A to 5C illustrate exemplary focus assist display forms.

A focus assist frame 500 is displayed in a region corresponding to the focus detection range 402 illustrated in FIGS. 4A to 4E. The focus assist frame and the focus detection range here are not necessarily matched but may substantially be matched. Graphic representations 502 to 507 are visually indicative of a defocus amount and a defocus direction and move along a broken line 501. The broken line 501 is not displayed on the display unit 205.

Changes in the focus assist display mode in accordance with the focusing state will be described in detail with reference to FIGS. 5A to 5C. First, FIG. 5A illustrates a focusing state in a case where the focus lens is present on a minimum-object-distance side about a subject within the focus assist frame 500. In a case where the focus lens is present on the minimum-object-distance side, the graphic representation 502 arranged outside of the broken line 501 and the two graphic representations 503 and 504 arranged inside the broken line 501 are displayed. With the graphic representation 502 stopped at an upper position, the graphic representations 503 and 504 move along the broken line 501 horizontally symmetrically about the centerline in accordance with the defocus amount. The distances from the graphic representations 503 and 504 to the graphic representation 502 increase as the defocus amount increases.

FIG. 5B illustrates a focusing state in a case where the focus lens is present on the infinite end side about the subject within the focus assist frame 500. In a case where the focus lens is present on the infinite end, the graphic representation 507 arranged inside the broken line 501 and the two graphic representations 505 and 506 arranged outside the broken line 501 are displayed. With the graphic representation 507 stopped at an upper position, the graphic representations 505 and 506 move along the broken line 501 horizontally symmetrically about the centerline in accordance with the defocus amount. The distances from the graphic representations 505 and 506 to the graphic representation 507 increases as the defocus amount increases.

FIG. 5C illustrates a focusing state in a case where the focus lens is present at an in-focus position about the subject within the focus assist frame 500. The graphic representation 502 can represent a state in which the graphic representations 505 and 506 are overlapped, and the graphic representation 507 can represent a state in which the graphic representations 503 and 504 are overlapped. When the focus lens is at the in-focus position, the graphic representation 502 and the graphic representation 507 position most closely.

FIG. 14A illustrates another example of a focus assist display 1400 indicative of a focusing state. A focus detection region 1401 represents a region for detecting a focusing state, and display parts 1402 to 1405 represent detected focusing states. When focus assist display is implemented, the display parts are superimposed on an image displayed on the display unit 205.

The angle display part 1402 is an index indicative of a distance to an in-focus position (corresponding to a defocus amount), and the in-focus position display part 1403 indicates the in-focus position. The angle display part 1402 moves along a round part 1404 in accordance with a focusing state and is displayed at the same position as the in-focus position display part 1403 when an in-focus state is obtained. When an in-focus state is obtained, the display parts may be displayed in colors different from those in an out-of-focus state. The angle formed by the angle display part 1402 and the in-focus position display part 1403 varies in accordance with the focus detection result (defocus amount) obtained from the focus detection region 1401. The direction display part 1405 is an index indicative of the direction toward an in-focus state. This indicates whether the out-of-focus state occurs toward the minimum-object-distance side or toward the infinite distance side about an in-focus position. As described above, the focusing state display is implemented by using display parts indicative of the distance to an in-focus position, the direction, and an in-focus state.

The focus assist display 1400 configured as described above changes its state as illustrated in FIG. 14B in order to clearly notify a user whether an in-focus state has been obtained or not. First of all, different angles are formed by the in-focus position display part 1403 and the angle display part 1402 between a case where the focus lens 103 is at a position away from an in-focus position (large blur) and a case where the focus lens 103 is a position close to the in-focus position (small blur). In other words, as illustrated in FIG. 14B, a larger angle θ1 for large blur than an angle θ2 for small blur can notify a user of a distance from the in-focus position. The angle changes smoothly in accordance with the focusing state. At an in-focus state, the angle display part 1402 representing the angle and the in-focus position display part 1403 are superimposed. The display color or thickness of the round part 1404 may be changed at an in-focus state.

When the distance (defocus amount) to an in-focus position is not available and the in-focus direction is only available, the direction display part 1405 is displayed without displaying the angle display part 1402. When both of the distance and direction to an in-focus position are not available, both of the angle display part 1402 and the direction display part 1405 are not displayed, indicating that the focus detection is invalid. In this case, the color or colors or shape or shapes of the focus detection region 1401 and/or round part 1404 may also be changed.

The availability of distance and direction to an in-focus position may be determined based on the degree of reliability of a focus signal. For example, when the degree of reliability is higher than a first threshold value, it can be determined that both of the distance and direction to an in-focus position are available. When the degree of reliability is equal to or lower than the first threshold value and is higher than a second threshold value, it can be determined that the in-focus direction is only available. When the degree of reliability is equal to or lower than the second threshold value, it is determined that both of the distance and direction to the in-focus position are not available.

The focus assist display 1400 is movable to an arbitrary position designated by a user by performing a touch operation on the display unit 205 or using a cross key, not illustrated, for example. The focus assist display 1400 may be displayed on a distinct part when a subject is detected. For example, when a subject 1407 is detected, the focus assist display 1400 is automatically placed at a position of the eye or nose being a distinct part of the subject 1407 (face of a human figure) as illustrated in FIG. 14C.

The focus assist display style is not limited to the style described above if the defocus amount and the defocus direction can be visually clear. An enlarged focus assist region may also be displayed.

Focus Detection Processing

Next, focus detection processing based on phase difference detection for calculating a defocus amount in step S304 in FIG. 3 will be described with reference to FIG. 6. FIG. 6 is a flowchart illustrating a flow of the focus detection processing based on phase difference detection.

First in step S601, the focus detection signal processing unit 204 obtains a pair of image signals from a focus detection region within a focus detection range set in step S302. In step S602, the focus detection signal processing unit 204 calculates a correlation from the pair of image signals obtained in step S601. In step S603, the focus detection signal processing unit 204 calculates an amount of change in correlation from the correlation calculated in step S602.

In step S604, the focus detection signal processing unit 204 calculates an amount of focus shift from the amount of change in correlation calculated in step S603. In step S605, the focus detection signal processing unit 204 calculates reliability representing how much the amount of focus shift calculated in step S604 is reliable. The reliability is a value calculated based on the matching degree and steeping degree of the two images of the image signals, as described above. The processing from step S601 to step S605 is performed an equal number of times to the number of focus detection regions present within the focus detection range illustrated in FIGS. 4A to 4E.

In step S606, the camera control unit 207 converts the amount of focus shift to a defocus amount for each focus detection region. In step S607, the camera control unit 207 determines the focus detection region to be used for focus assist display, and the focus detection processing ends.

Details of Correlation Computation

Next, with reference to FIGS. 7A to 7C and FIGS. 8A to 8D, the focus detection processing based on phase difference detection illustrated in FIG. 6 will be described in more detail.

Figure 7A:
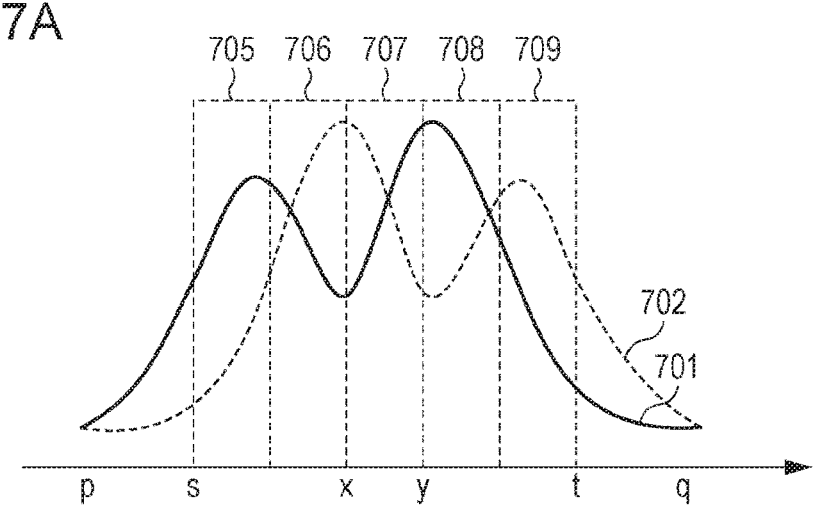
FIGS. 7A to 7C illustrate image signals obtained from focus detection regions according to an exemplary embodiment.
Figure 7B:
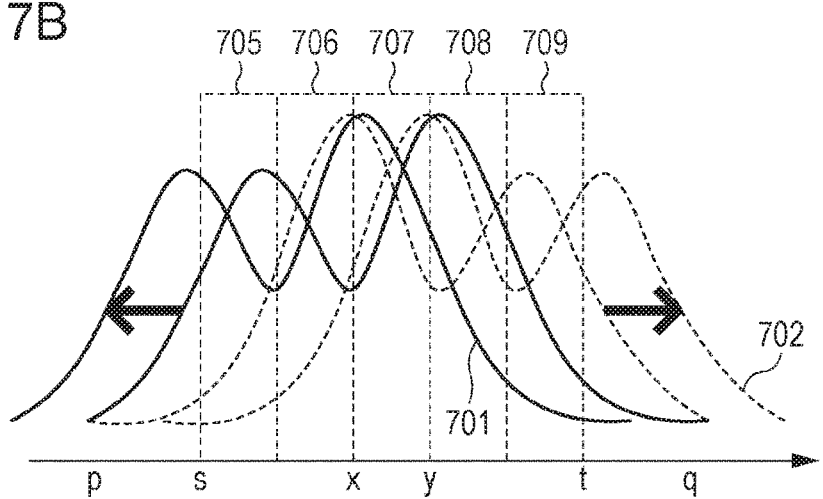
Figure 7C:
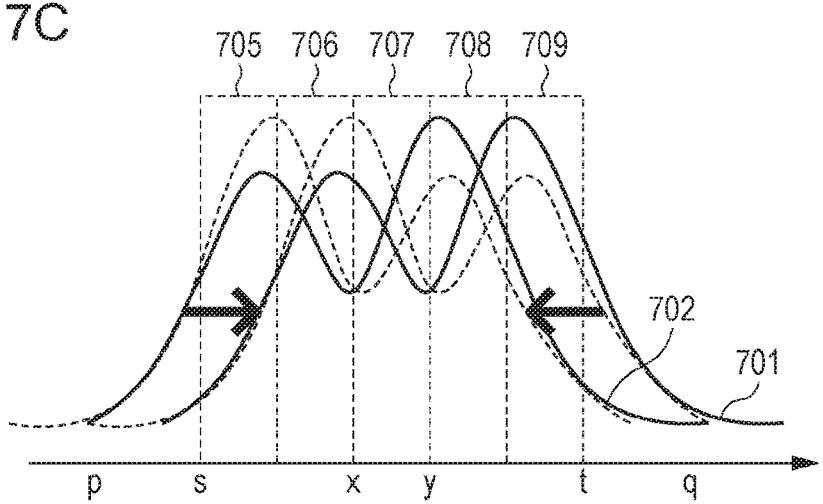

FIGS. 7A to 7C illustrate image signals obtained from a focus detection region set as in FIGS. 4A to 4E. A focus detection range positions from the coordinates s to t, and a range necessary for a focus detection calculation in consideration of a shift amount positions from the coordinates p to q. One focus detection region division positions from the coordinates x to y.

FIG. 7A illustrates waveforms of image signals before a shift. In FIGS. 7A to 7C, an image signal A (A image) is indicated by a solid line 701, and an image signal B (B image) is indicated by a broken line 702. Regions 705 to 709 are focus detection regions as a result of the division in FIGS. 4A to 4E.

FIG. 7B illustrates results of a shift in the positive direction of the image waveforms before the shift in FIG. 7A, and FIG. 7C illustrates results of a shift in the negative direction of the image waveform before the shift in FIG. 7A. In order to calculate the correlation, the image signal A 701 and the image signal B 702 are shift by 1 bit in the directions indicated by the corresponding arrows.

Next, a method for calculating a correlation COR will be described. First, as illustrated in FIGS. 7B and 7C, the image signal A and the image signal B are shifted by 1 bit, and a sum of absolute values of the corresponding differences between the image signal A and image signal B is calculated. In this case, the shift amount is indicated by i, the minimum number of shifts is indicated by p−s in FIGS. 7A to 7C, and a maximum number of shifts is indicated by q−t in FIGS. 7A to 7C. In FIGS. 7A to 7C, x indicates a start coordinate of a focus detection region, and y is an end coordinate of the focus detection region. By using these values, the correlation COR can be calculated by $$COR[i] = \sum_{k=x}^{y} |A[k+i] - B[k-i]| \qquad (1)$$

$$\{(p-s) < i < (q-t)\}$$

Figure 8A:
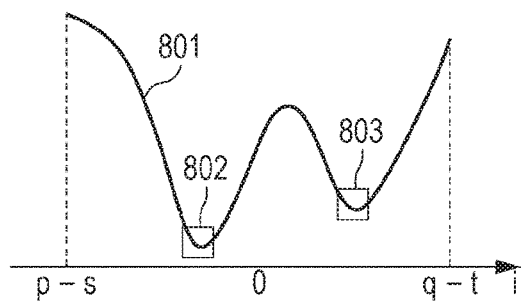
FIGS. 8A to 8D illustrate a correlation calculation method according to an exemplary embodiment.

FIG. 8A illustrates a waveform of the correlation. FIG. 8A is a graph plotting the shift amount along an axis of abscissae and the correlation along an axis of ordinates. A correlation waveform 801 has regions 802 and 803 around an extremum. From the graph, it can be said that the matching degree between the image A and the image B increases as the correlation decreases.

Next, a method for calculating an amount of change in correlation ΔCOR will be described. First, an amount of change in correlation is calculated from a difference between correlations of every other shifts on the correlation waveform in FIG. 8A. In this case, the shift amount is indicated by i, the minimum number of shifts is indicated by p−s in FIGS. 7A to 7C, and a maximum number of shifts is indicated by q−t in FIGS. 7A to 7C. By using these values, the amount of change in correlation ΔCOR can be calculated by Expression (2).

$$\Delta COR[i]=COR[i-1]-COR[i+1]\{(p-s+1)<i<(q-t-1)\} \quad (2)$$

Figure 8B:
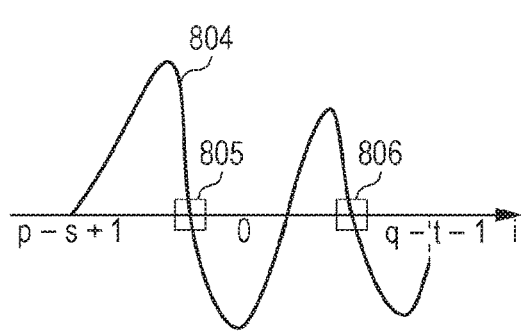

FIG. 8B illustrates a waveform of the amount of change in correlation ΔCOR. FIG. 8B is a graph plotting the shift amount along an axis of abscissae and the amount of change in correlation along an axis of ordinates. The waveform 804 of the amount of change in correlation has regions 805 and 806 where the amount of change in correlation changes from a positive value to a negative value. The region where the amount of change in correlation is turned to be zero is called a zero-crossing. The matching degree of the image A and the image B is the highest In the zero-crossing, and the corresponding shift amount is an amount of focus shift.

Figure 8C:
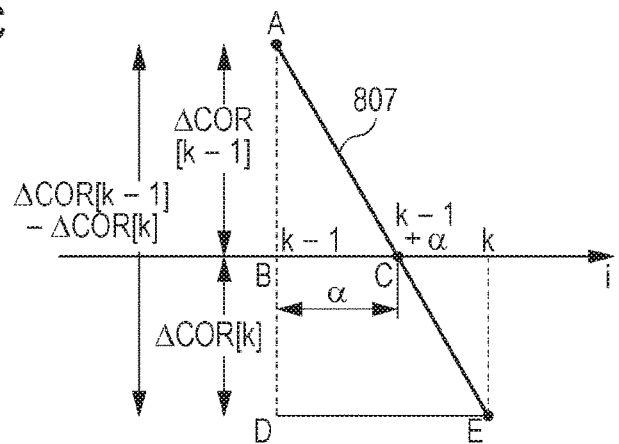

FIG. 8C illustrates an enlarged view of the region 805 in FIG. 8B which includes a part 807 of the waveform 804 of amount of change in correlation. With reference to FIG. 8C, a method for calculating an amount of focus shift PRD will be described. The amount of focus shift is first divided into an integer part β and a decimal part α. From the similarity of the triangle ABC and the triangle ADE in FIG. 8C, the decimal part α can be calculated by Expression (3).

$$AB:AD = BC:DE \quad (3)$$
$$\Delta COR[k-1]:\Delta COR[k-1]-\Delta COR[k] = \alpha:k-(k-1)$$
$$\alpha = \frac{\Delta COR[k-1]}{\Delta COR[k-1]-\Delta COR[k]}$$

From FIG. 8C, the integer part β can be calculated by Expression (4).

$$\beta=k-1 \quad (4)$$

As described above, from the sum of α and β, the amount of focus shift PRD can be calculated.

In a case where a plurality of zero-crossings is present as in FIG. 8B, a zero-crossing with a high steeping degree max der of the change in correlation (hereinafter, called a steeping degree) is called a first zero-crossing. The steeping degree is an index indicative of easiness of focus detection. As the value increases, the easiness of focus detection increases. The steeping degree can be calculated by Expression (5) below.

$$\max der=|\Delta COR[k-1]|+|\Delta COR[k]| \quad (5)$$

As described above, in a case where a plurality of zero-crossings is present, the first zero-crossing is determined based on the steeping degree.

Next, a method for calculating the reliability of an amount of focus shift will be described. The reliability can be defined by the steeping degree, the matching degree fnclvl of two images corresponding to the image signals A and B (hereinafter, called two-image matching degree). The two-image matching degree is an index indicative of the precision of an amount of focus shift. As the value decreases, the precision increases.

Figure 8D:
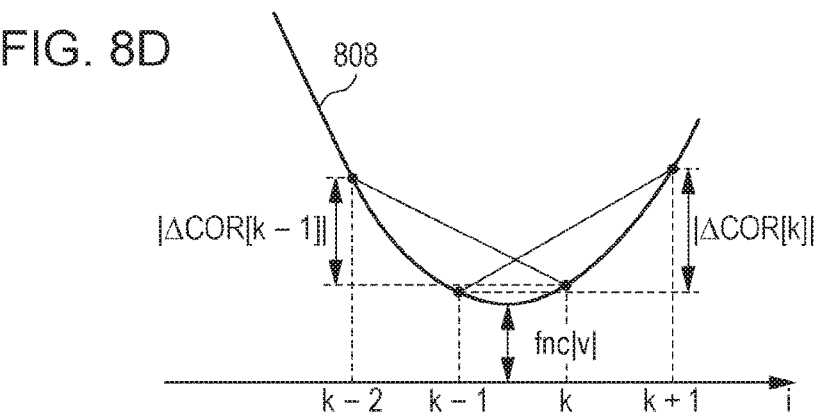

FIG. 8D illustrates an enlarged view of the region 802 in FIG. 8A which includes a part 808 of the correlation waveform 801. The two-image matching degree can be calculated by Expression (6) below.

$$fnclvl=COR[k-1]+\Delta COR[k-1]/4$$

where (i) $|\Delta COR[k-1]|\times 2 \leq \max der$ $$fnclvl=COR[k]-\Delta COR[k]/4$$

where (ii) $|\Delta COR[k-1]|\times 2 > \max der \quad (6)$

Processing for Setting Focus Assist Display Region

Next, the processing for setting a focus assist display region in step S302 in FIG. 3 will be described with reference to FIG. 9 and FIGS. 10A to 10G. FIG. 9 is a flowchart illustrating a flow of the processing for setting a focus assist display region according to this exemplary embodiment. According to this exemplary embodiment, the size of a focus assist display region is fixed to a predetermined size smaller than a minimum detectable face size though the size of the focus assist display region may be changeable. The predetermined size may be a minimum size in which focus detection can be performed.

First, in step S901, the camera control unit 207 determines whether the subject detecting unit 210 has detected a face of a human figure or not in the processing in step S301. If a face of a human figure has been detected, the processing advances to step S902. If not, the processing advances to step S903.

In step S902, the camera control unit 207 determines whether the size of the detected face is larger than a predetermined threshold value TH1 or not. If it is determined that the size of the detected face is larger than the threshold value TH1, the processing advances to step S904. If it is determined that the size of the detected face is equal to or lower than the threshold value TH1, the processing advances to step S911.

Here, the predetermined threshold value TH1 is defined such that a focus assist frame set in accordance with the position of one of the right and left eyes (distinct region) cannot fit within a face frame if the size of the face is equal to or lower than the threshold value TH1. The method for determining the threshold value TH1 may be assumed as a value approximately two times the size in the horizontal direction of the focus assist frame, for example through it is not limited thereto. In general, in a case where a human figure is imaged, focus adjustment of an eye of a human figure (one of the right and left eyes because the focus position differs between the right and left eyes). Therefore, when a human figure is imaged in the MF mode, the focus assist display may be implemented in a region having one of the right and left eyes. Then, a user can save the time and labor for performing an operation for moving the focus assist frame to the eye region.

Figure 10A:
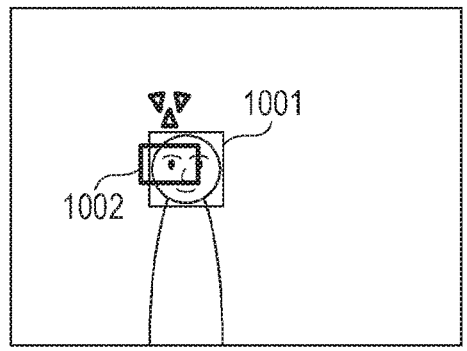
FIGS. 10A to 10G illustrate examples of a displayed focus assist frame according to the first exemplary embodiment.

However, in a case where a face is present at a far position from a camera or where the face of a human figure within an image is small because the focal length is in the wide-angle direction, a difference in focus between the eye and another part is difficult to be recognized. FIG. 10A illustrates an example in a case where the size of the detected face (corresponding to a face frame 1001) is small. When a focus assist frame 1002 having a size settable under control is set in accordance with the position of one eye (right eye in this case) as illustrated in FIG. 10A, the proportion of the background occupying the frame may be large. This may cause an erroneous detection, and the possibility may increase in which the focus assist display may vary between times or a user may improperly determine a focusing state as an in-focus state.

If the size of the focus assist frame settable under control can be set in accordance with an eye region, the detection of a defocus amount is difficult because the focus detection range is significantly small. Therefore, it is not suitable for a case where focus adjustment is performed by performing an MF operation by checking changes in the state of the assist display from a largely blurred state.

Figure 10B:
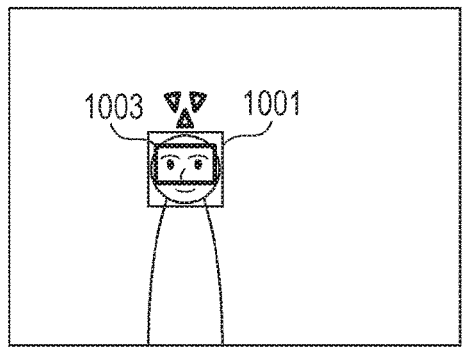

Accordingly, when the size of the detected face is equal to or lower than a predetermined threshold value, a focus assist frame 1003 is set so as to fit into the face frame 1001, as illustrated in FIG. 10B, in step S911. In this case, the focus assist frame 1003 may be set so as to include the eye region for higher contrast of the image signals. Setting the focus assist frame 1003 in FIG. 10B within the face frame 1001 can prevent an influence of the background. Thus, the possibility of occurrence of an erroneous detection can be reduced, and the in-focus state can be recognized accurately by a user. When the size of the focus assist frame is changeable, a focus assist frame may be set in a region substantially identical to the face frame or a region having a size equal to or higher than a predetermined ratio within the face frame.

In order to detect the position of the eye from the face of a human figure, a (relative) position at a general ratio from the size and position of the detected face (such as a position at ⅓ of a length of the face from an upper position of the face) may be defined as the position of the eye. Alternatively, the subject detecting unit 210 may perform a publicly known detection process on an image pickup signal output from the CDS/AGC converter 202 to detect a specific region (of the eye, ear, nose, or mouth, for example) within an image region of a detected face.

On the other hand, if the size of the detected face is larger than the predetermined threshold value TH1, the camera control unit 207 in step S904 receives direction information of the detected face from the subject detecting unit 210 and determines the direction of the face. If it is determined that the direction of the face is forward, the processing moves to step S905. If it is determined that the direction of the face is sideways, the processing moves to step S906. It may be determined that the direction of the face is forward if the angle of the face about the camera (imaging optical system) is equal to or within a predetermined angle.

In step S905, the camera control unit 207 receives position information of the detected face from the subject detecting unit 210 and determines which of the right and left sides the position of the face is on about the center of the horizontal direction of an imaging screen. If the position of the face is on the left side of the screen, the processing moves to step S907. If the position of the face is on the right side of the screen, the processing moves to step S908.

In step S907, the camera control unit 207 sets a focus assist frame at the position corresponding to the right eye of the human figure. As an example of a specific setting method, the centroid position of a focus assist frame may be set at the centroid position of the right eye region, though it may be set in accordance with other references. After the focus assist frame is set at the position corresponding to the right eye of the human figure, the processing moves to step S914.

On the other hand, the camera control unit 207 sets the focus assist frame at a position corresponding to the left eye of the human figure in step S908, and the processing then moves to step S914. Also in this case, the centroid position of the focus assist frame may be set at the centroid position of the left eye region or may be set in accordance with other references.

The reason will be described why the focus assist frame is set at a position corresponding to the right eye or left eye of the human figure in accordance with the position of the face within a screen in step S907 and step S908 if the direction of the human figure is forward.

Figure 10C:
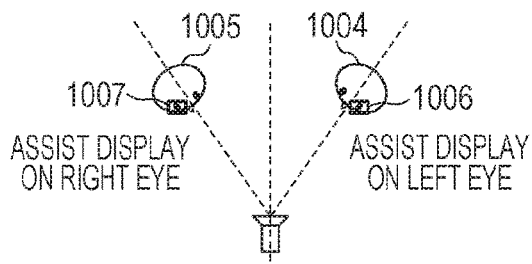

FIG. 10C illustrates an example of a scene where a human figure faces to the front. When the direction of a human figure is forward, the human figure also faces toward the camera. Therefore, there is a high possibility that the eye farther away from the center of the screen is present on the minimum-object-distance side on a focal plane. Generally, the focus may often be adjusted to the eye on the minimum-object-distance side of a human figure, the focus assist frame is set at a position corresponding to the eye farther away from the center of the screen according to this exemplary embodiment. This can save the time and labor of a user for performing an operation for moving the focus assist frame to the position of the eye on the minimum-object-distance side.

For the reason above, when a human figure is on the right-hand side (position 1004) of a camera, the focus assist frame 1006 is set on the left eye of the human figure. When the human figure is on the left side (position 1005) of the camera, the focus assist frame 1007 is set on the right eye of the human figure.

On the other hand, in step S906, the camera control unit 207 receives information regarding the direction of the detected face from the subject detecting unit 210 and determines the direction of the face. Here, if the right side of the face directs toward the screen, it is determined that the direction of the face is rightward. If the left side of the face directs toward the screen, it is determined that the direction of the face is leftward. If the direction of the face is rightward, the processing moves to step S909. If the direction of the face is leftward, the processing moves to step S910.

In step S909, the camera control unit 207 sets the focus assist frame at a position corresponding to the right eye of the human figure, like step S907. The processing then moves to step S914. In step S910, the camera control unit 207 sets the focus assist frame at a position on the left eye of the human figure, like step S908. The processing moves to step S914.

The reason will be described why the focus assist frame is set on the right eye or left eye of a human figure in accordance with the direction of the face of a human figure in step S909 and step S910.

Figure 10D:
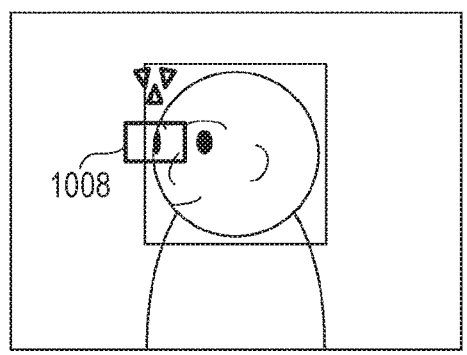
Figure 10E:
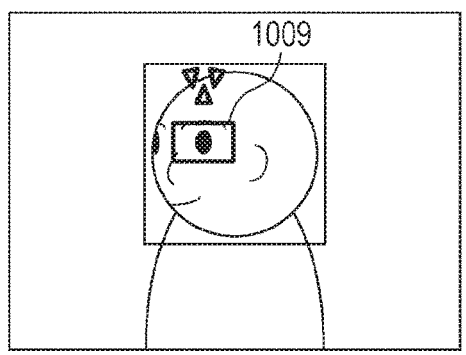

FIGS. 10D and 10E illustrate a state in which the direction of a human figure is leftward. First of all, as illustrated in FIG. 10D, setting a focus assist frame 1008 at a position corresponding to the right eye when the direction of the human figure is leftward increase the proportion of the background occupying the region, like a case where the size of the face is small. Thus, erroneous detections may easily occur, and there is an increased possibility that the focus assist display may vary from time to time. Because of this, there is an increased possibility that a user may not easily adjust the focus lens to an in-focus position by performing an MF operation or may determine that an in-focus state is obtained at an improper focus lens position.

When the direction of a human figure is leftward, it means the left eye is on the minimum-object-distance side. Accordingly, setting the focus assist frame 1009 at the position corresponding to the left eye on the minimum-object-distance side as illustrated in FIG. 10E can save user's labor and time for performing an operation for moving the focus assist frame to the position corresponding to the eye on the minimum-object-distance side.

In step S914, the camera control unit 207 stores information regarding the position of the focus assist frame set in step S907 to S911 about a region (face frame) of the face. Information regarding the proportion of the size of the focus assist frame about the region (face frame) of the face may also be stored.

On the other hand, when no face has been detected in step S901, the processing moves to step S903 where the camera control unit 207 determines whether a face tracking mode is enabled or not. In the face tracking mode, when a state where a face is being detected shifts to a state where no face is detected, a region highly possibly corresponding to a face is being estimated from information immediately before the state where no face is detected and an amount of characteristics of a general face. If the camera control unit 207 determines that the face tracking mode is enabled, the processing moves to step S912. If it is determined that the face tracking mode is not enabled, the processing moves to step S913.

In step S912, the camera control unit 207 reads out information regarding the position of the focus assist frame stored in step S914 about the region corresponding to the face. The stored position is converted to the position about the region (tracking region) corresponding to the face being tracked, and the focus assist frame is set based on the position. When the size of the focus assist frame is changeable, information regarding the proportion of the size of the focus assist frame to the region corresponding to a face may be stored in step S914 and be read out to set the size of the focus assist frame. In this case, the stored size (the proportion of the size to the face frame) to the size to the tracking region to set the focus assist frame.

Figure 10F:
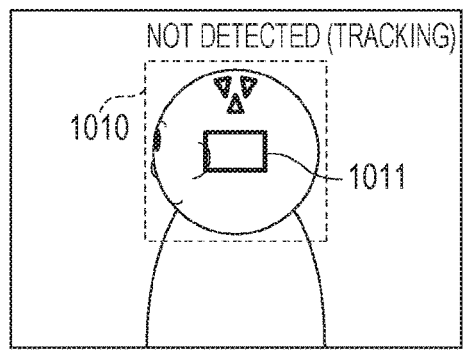
Figure 10G:
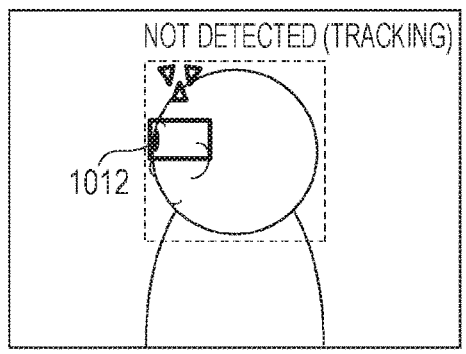

The reason why the processing in step S912 is performed will be described with reference to FIGS. 10F and 10G. FIGS. 10F and 10G illustrate a scene in which a human figure whose face is sideways and the face is no longer detected, resulting in the face tracking mode. As illustrated in FIG. 10F, when a focus assist frame 1011 is set at the center of a tracking region 1010, there is a high possibility that the focus assist frame 1011 comes off the position of the eye of the human figure. Accordingly, as illustrated in FIG. 10G, a focus assist frame 1012 may be set based on the position of the focus assist frame immediately before the face tracking mode is enabled so that the possibility can increase in which the focus assist frame 1012 contains the eye of a human figure. When the human figure at the state in FIG. 10G turns to the camera again, the face may be detected again. Thus, the focus assist frame can be smoothly kept set at the position of the eye.

On the other hand, in step S913, the camera control unit 207 sets the focus assist frame at a prestored position. Then, the processing ends. According to this exemplary embodiment, the prestored position is the center of the screen. However, an embodiment of the present invention is not limited thereto. If a face is detected for a predetermined period of time in neighborhood of the position subject to the tracking or if there is a low possibility that the detected subject is a face because of a lower amount of facial characteristics in the face tracking mode, the face tracking mode ends. When the face tracking mode ends and if a face is detected at a position different from the position subject to the face tracking, a focus assist frame may be set based on the detected face. If no other face is detected when the face tracking mode ends, a focus assist frame may be set a predetermined position and size prestored in the camera control unit 207, the position and size at the time when the face tracking mode ends may be held for setting.

According to this exemplary embodiment, when face detection is being performed in step S901 or when the face tracking mode is enabled in step S903, that is, when facial information is being obtained, a focus assist frame is set within a face frame(which will be called "facial MF mode", for example). On the other hand, when face detection is not being performed and the face tracking mode is not enabled, that is, when facial information is not being obtained, a focus assist frame is set based on a prestored position ("normal MF mode", for example).

Processing for Changing Focus Assist Display Region

Figure 13:
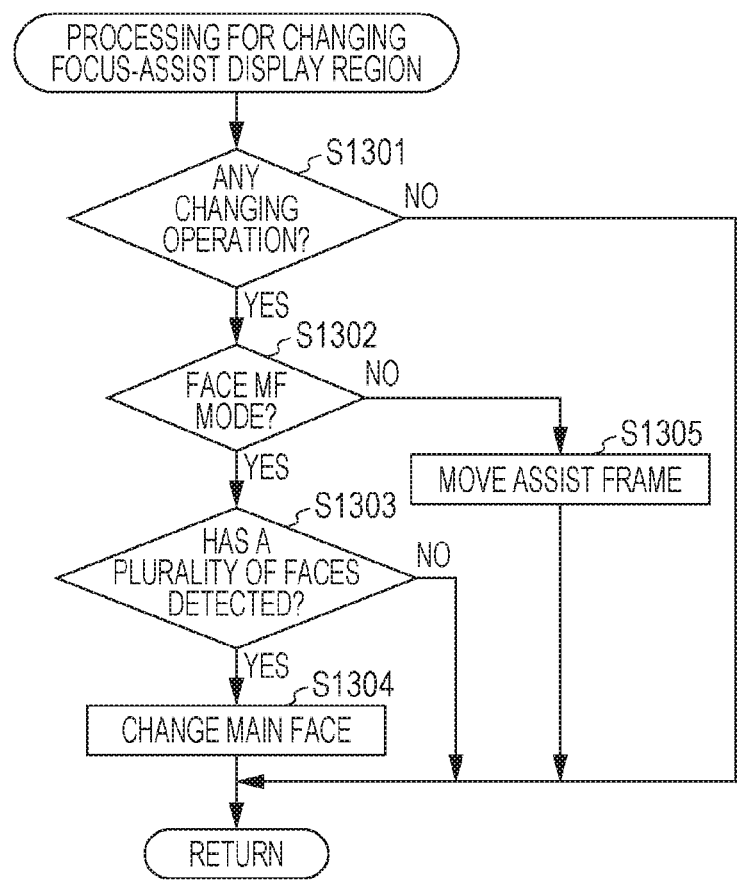
FIG. 13 is a flowchart illustrating focus assist display region changing processing according to an exemplary embodiment.

Next, processing for changing a focus assist display region in step S303 in FIG. 3 will be described with reference to FIG. 13. FIG. 13 is a flowchart illustrating a flow of the processing for changing a focus assist display region.

First, in step S1301, the camera control unit 207 receives a change operation through the camera operating unit 208 and determines whether a change operation has been performed or not. The change operation here is assumed as an input operation with a cross key or a touch operation onto the display unit 205, for example, the operating member and the form of operation are not limited thereto. If a change operation is performed, the processing moves to step S1302. If a change operation is not performed, the flow ends.

In step S1302, the camera control unit 207 determines whether the facial MF mode is enabled or not. If the facial MF mode is enabled, the processing moves to step S1303. If not, the processing moves to step S1305.

In step S1303, the camera control unit 207 determines whether the subject detecting unit 210 has detected a plurality of faces in the processing in step S301 or not. If so, the processing moves to step S1304. If not, the flow ends.

In step S1304, the camera control unit 207 performs processing for changing the main face for which a focus assist frame is to be set in accordance with the operation detected in step S1301. In other words, the focus assist frame is moved to a face excluding the face for which the current focus assist frame is displayed. After performing the processing for changing the main face, the flow ends.

On the other hand, in step S1305, the camera control unit 207 performs processing for moving the position of the focus assist frame in accordance with the operation detected in step S1301. For example, the focus assist frame may be moved by a predetermined amount in the direction operated on the cross key, or the focus assist frame is moved to the position designated by a touch operation on the display unit 205. After performing the processing for moving the position of the focus assist frame, the flow ends.

As described above, according to this exemplary embodiment, if a change operation is performed through the camera operating unit 208 while focus assist display is being implemented, the processing is changed in accordance with the state related to obtaining of facial-information. More specifically, if information regarding a plurality of faces is obtained, processing for changing the face for which the focus assist frame is to be set is performed. If facial information is not obtained, the processing for moving the position of the focus assist frame is performed in accordance with the change operation. This is because the focusing state of one eye may be displayed when facial information is obtained also if a user operates the camera operating unit 208 in order to change the focus assist frame position, as described above.

Having described the setting of a focus assist frame in the MF mode, the focus assist frame is not set in the AF mode but an AF frame for obtaining a signal for performing focus adjustment is set. Here, when an AF frame is set on a region for one eye if facial detection is performed in the AF mode, the size of the AF frame is reduced. Thus, when a subject moves, the association of the subject with the AF frame may easily change, and the AF is highly possibly instable. Accordingly, in the AF mode, stable AF can be achieved by setting the AF frame for a face region (for example, the AF frame may be set to have a size substantially equal to that of the face frame). For the reason above, even when the operation for changing the size of the AF frame is performed through the camera operating unit 208, the minimum size of the AF frame is set to a size larger than the focus assist frame.

Also when the size of the focus assist frame is fixed, the size of the AF frame is changeable in the AF mode. This is because a smaller focus detection range may be set for performing precise focus adjustment by a manual operation in the focus assist display while the AF frame may be set in accordance with the size of a subject in the AF.

As described above, according to this exemplary embodiment, the setting of the focus assist frame is changed in accordance with the state related to obtaining of subject information. For example, in a case where information related to a predetermined subject (such as the face) is obtained, the focus assist frame is set within a region corresponding to the predetermined subject in consideration of the focus adjustment to be performed by an MF operation on the predetermined subject. Particularly when information related to a subject (such as the face) having a plurality of feature parts (such as the eyes) is obtained, a feature part on the minimum-object-distance side is determined based on the state of the subject for implementing focus assist display. Thus, an indicator (focus assist display) representing a focusing state can be displayed at a proper position about the subject so that user's convenience can be improved.

According to this exemplary embodiment, when a user performs an operation for changing the focus assist frame, processing is performed based on a state related to obtaining of subject information. For example, when a plurality of pieces of information regarding a predetermined subject is detected, processing is performed for changing the subject for which the focus assist frame is set in accordance with a user's operation. Thus, the user's intention for the changing can be reflected in a proper manner for the subject to set the focus assist frame.

Problems of Stability and Responsiveness of Focus Assist Display

A problem that stable focus detection results are not obtained due to changes of the picture within the focus detection region 1401 in a case where a user moves the focus detection region 1401 or where the focus assist display 1400 is implemented automatically within a subject, for example. In this case, the angle display part 1402 and the direction display part 1405 do not change smoothly, which makes a user feel a sense of unease regarding his or her focus operation. Accordingly, results of a plurality of focus detections may be averaged for use to improve the stability of the display 1400. However, though the display of the angle display part 1402 and the direction display part 1405 becomes stable, the use of such an average value may impair the responsiveness because data regarding the subject which have been detected in the past are used in a case where the subject is changed when, for example, the focus detection region is moved.

Focus Assist Display Control Based on Moving Amount of Focus Assist Frame

A method for changing the focus assist display control based on an amount of change (moving amount) of a position of a focus detection region will be described below with reference to FIG. 15. For example, according to exemplary embodiment, contents (items) of focus assist display, the average number of focus detection results to be used for angle display, and the position of the focus detection region are changed. The focus assist display control is changed in a case where focus assist display is moved manually and in a case where focus assist display is moved automatically (while a subject is being detected). Manual movement of a focus detection region roughly includes three patterns. The amount of change of the position of the focus detection region is determined based on an overlap rate of the focus detection region between the last detection of the focusing state and this detection of the focusing state. When the overlap rate is 100% to 80% (the amount of change is equal to or lower than a second amount), "no movement" is determined. When the overlap rate is 80% to 50% (the amount of change is higher than the second amount and equal to or lower than a first amount), "small movement (low speed)" is determined. When the overlap rate is 50% to 0% (the amount of change is higher than the first amount), "large movement (high speed)" is determined. Because focus detection is performed repeatedly in a predetermined period, a case where the amount of change (moving amount) of the focus detection region is large can be said as a case where the speed of movement of the focus detection region is high. As described above, according to this exemplary embodiment, the change in position of the focus detection region between the last focus detection and the present focus detection is determined, and the focus assist control is changed based on the determination result, which will be described below. More specifically, the responsiveness of the focus assist display is increased as the change in position of the focus detection region increases.

With "no movement" and "small movement", results of a plurality of detections of the focusing state are averaged, and the focus assist display showing the "angle" and the "direction" is implemented based on the average result. The "angle" here corresponds to the defocus amount, and the "direction" corresponds to the direction toward an in focus state. For "small movement", the number of times of averaging of detection results of the focusing state may be reduced, compared with that for "no movement", to increase the responsiveness of the focus assist display.

As illustrated in FIG. 15, for "no movement", the contents of the display are "angle" and "direction", and the number of times of averaging of focus detection results to be used for angle display is set as 10 for implementing stable display. For "small movement", the contents of the display are "angle" and "direction", and the number of times of averaging of focus detection results to be used for angle display is set as 5 for emphasizing the responsiveness more than stable display, compared with "no movement".

For "large movement", the content of the display is "direction" only, and no averaging of focus detection results to be used for angle display is performed. This is because averaging focus detection results for a plurality of periods may possibly result in use of focus detection results corresponding to a different subject in the past when the moving amount is large. Therefore, instead of the averaging of focus detection results, a value acquired based on a focus signal obtained from the focus detection region after the movement is directly used for focus assist display. However, in this case, the direction is only displayed without display of the angle because the angle display indicative of the distance (defocus amount) to an in-focus position may be instable. This is because, for "large movement", there is a possibility that a user has changed the subject and the complexity on the screen therefore can be reduced without displaying the angle for preventing instable and unnecessary display.

On the other hand, when the focus detection region is moved automatically upon detection of a subject, for example, the contents of the display are "angle" and "direction". Focus detection results corresponding to a plurality of focus detection regions set as will be described below within the detected subject are used for displaying the angle and the direction, without performing the processing for calculating the average of focus detection results to be used for angle display.

As described above, when whether the distance and direction to the in-focus position are available or not is determined based on the degree of reliability of the focus signal, the determination result is used by priority to determine the content or contents of the display. In other words, when both of the distance and direction to an in-focus position are not available, it is indicated that the focus detection is invalid. When the direction to an in-focus position is only available, the content of the display is "direction" only. When both of the distance and direction to an in-focus position are available, the content or contents of the display is or are determined in accordance with the amount of change of the position of the focus detection region, as illustrated in FIG. 15. For "no movement" and "small movement", if the number of times of determination that the distance to an in-focus position of the number of times of averaging focus detection results is equal to or higher than a predetermined number of times, "angle" (and "direction") may be displayed. In this case, the number of times of determination that the distance to an in-focus position is available is lower than the predetermined number of times, "direction" may only be displayed.

This is because, if a subject such as a face is detected, substantially no distance change may occur within a face, the precision of the focus detection can be increased by using the focus detection results from a plurality of focus detection regions within the corresponding face frame.

When a subject such as a human figure is detected, it may be expected that the subject may move around within the screen. Thus, application of the same display method as that for a case where a focus detection region is manually moved may result in easy occurrence of a case where THE moving amount of the focus detection region is determined as "large movement" and the angle display is disabled. Therefore, the focus assist display while a subject is detecting includes angle display and direction display using focus detection results from a plurality of focus detection regions defined within a subject detection frame. Thus, stable angle display using a plurality of focus detection results and improved responsiveness without performing the averaging process can both be implemented.

When a human figure is a subject, the focus detection region to be used may be changed in accordance with the angle of the face of the subject so that the precision of the focus assist display can further be improved.

Figure 16A:
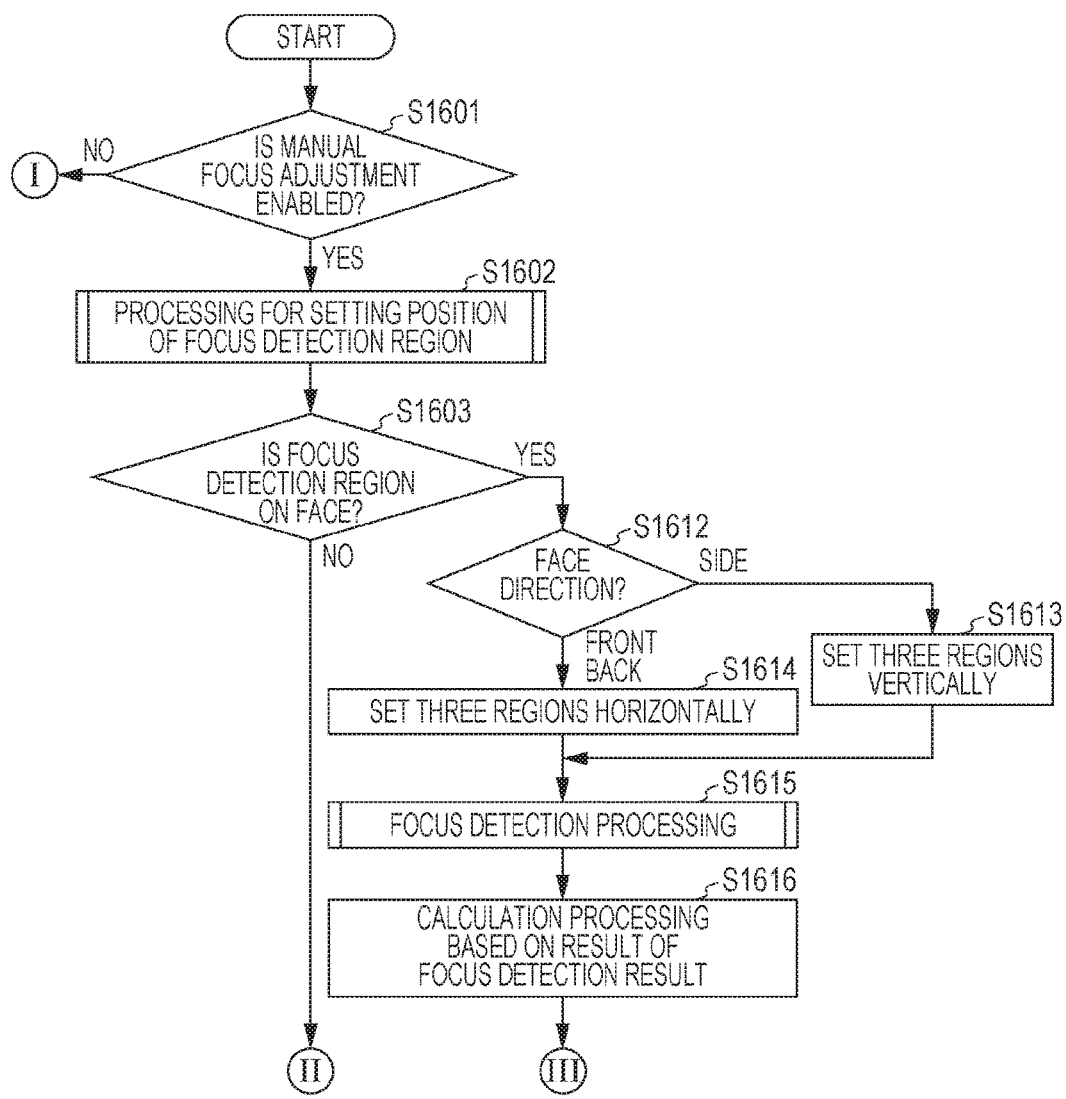
FIGS. 16A and 16B are flowcharts illustrating a main flow of control over display of focus assist display according to an exemplary embodiment.
Figure 16B:
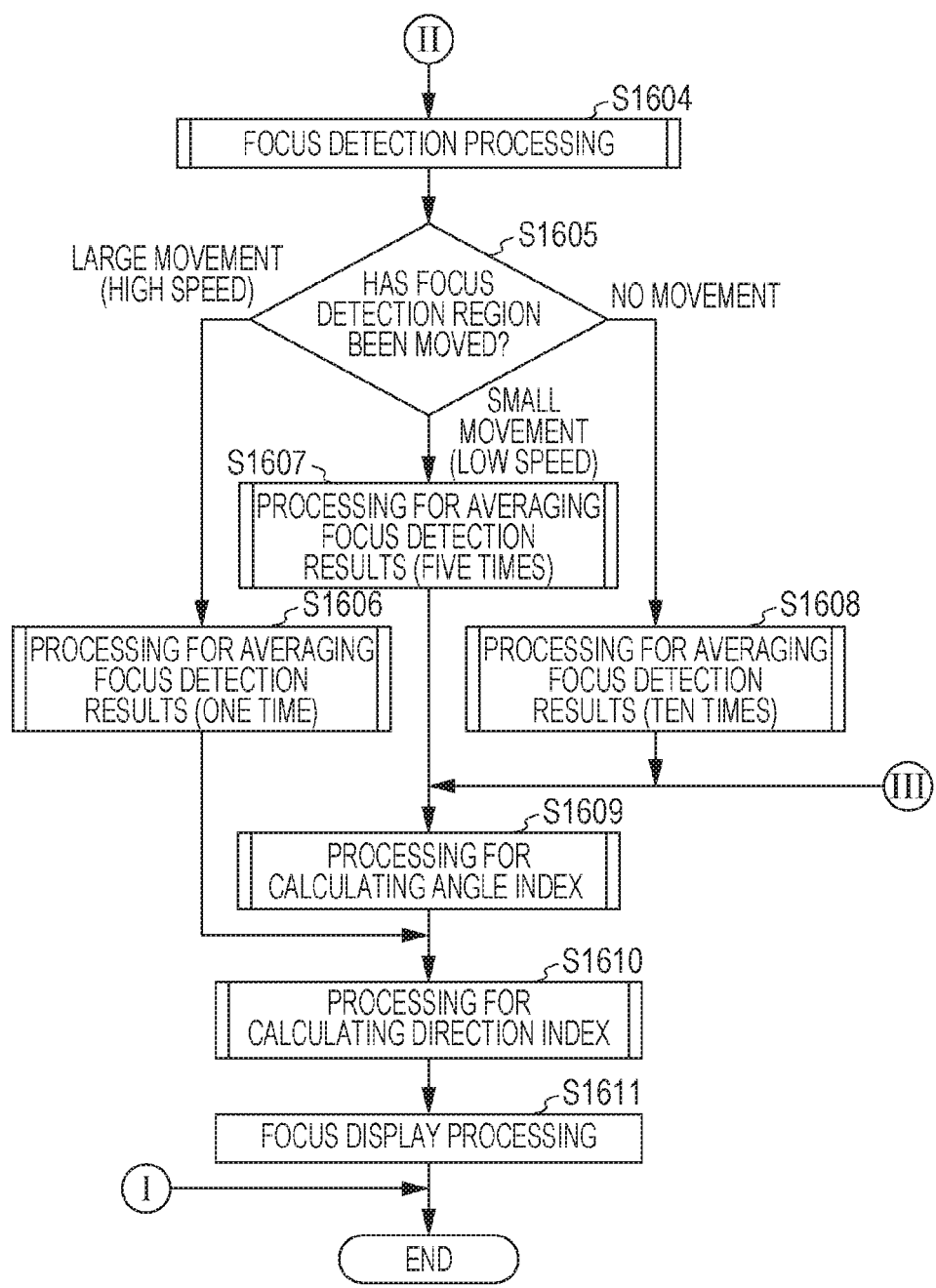

FIGS. 16A and 16B are flowcharts illustrating a procedure of focus assist display control to be executed by the camera control unit 207. This processing is executed in a predetermined period in accordance with a computer program stored within the camera control unit 207. For example, the processing may be executed in read cycles (every vertical synchronization period) of an image pickup signal from the image sensing element 201 for generation of an image for one frame (or one field) or may be repeated a plurality of number of times within a vertical synchronization period.

First of all, in step S1601, the camera control unit 207 determines whether a manual focus operation is enabled or not. If the manual focus operation is enabled, the processing moves to step S1602. If not, the processing ends without performing anything. In step S1602, the camera control unit 207 performing processing for setting a focus detection region.

Figure 17:
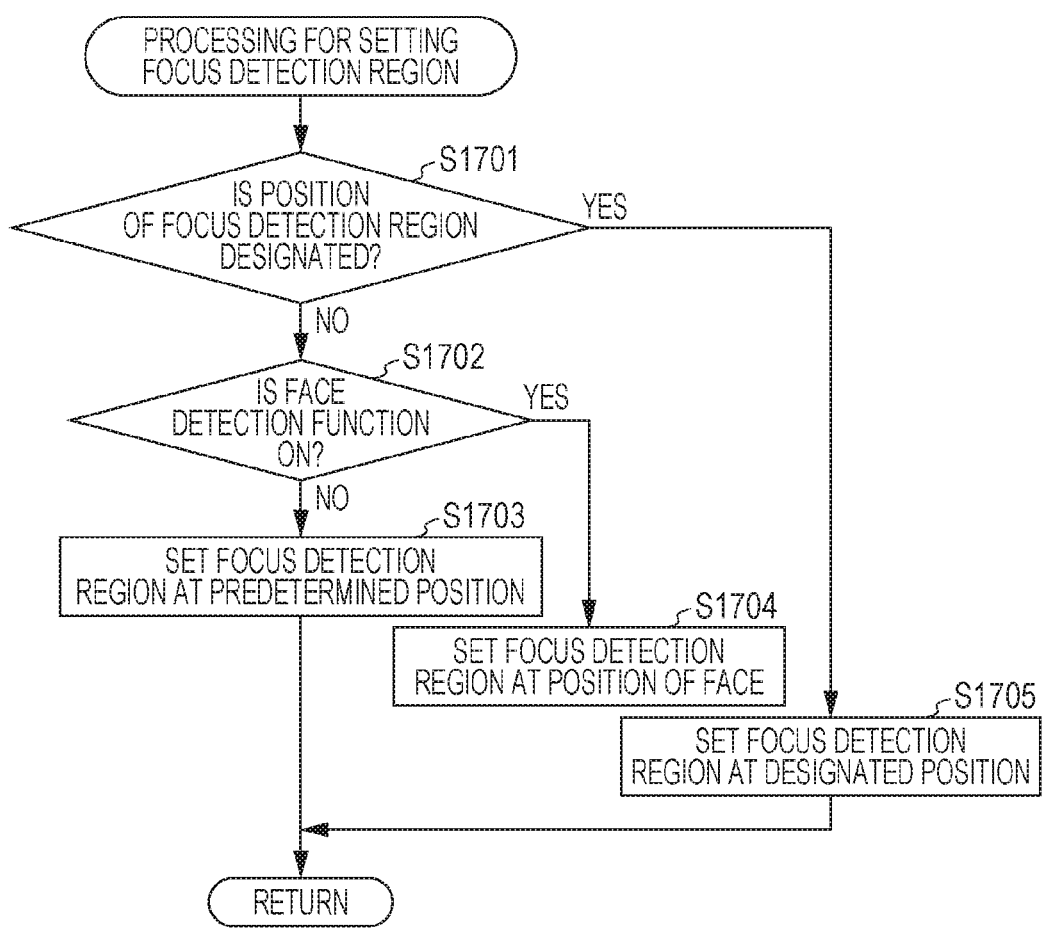
FIG. 17 is a flowchart illustrating an example of processing for setting a focus detection region according to an exemplary embodiment.

The processing for setting a focus detection region to be performed in step S1602 is performed in the same manner as in FIGS. 4A to 4E. With reference to FIG. 17, a flow of the processing for setting a focus detection region will be described.

FIG. 17 is a flowchart illustrating an example of the processing for setting a focus detection region. First of all, in step S1701, the camera control unit 207 determines whether the position of the focus detection region has been designated or not is determined. If the position of the focus detection region has been designated, the processing moves to step S1705. If not, the processing moves to step S1702. The position may be designated by a user by operating a touch panel or a cross key, not illustrated, for example, though how the position is designated is not described in detail here because it is different from the gist of the present invention. In step S1705, the camera control unit 207 sets a focus detection region at the designated position as illustrated in FIG. 4E.

In step S1702, the camera control unit 207 determines whether a function for detecting a subject (face detection function here) is ON or OFF. If the function for detection of a subject is ON, the processing moves to step S1704. If not, the processing moves to step S1703. In step S1703, because the face detection is not performed and the position of the focus detection region is not designated, the camera control unit 207 sets the focus detection region at a predetermined position (such as the center). In step S1704, the camera control unit 207 sets the focus detection region at the position of the detected face as illustrated in FIG. 4D. When no face is detected, the focus detection region may be set at a predetermined position as in step S1703.

In step S1704, the processing (processing for setting a focus assist frame in accordance with the size, direction, and position of the face) as a result of determination of Yes in S901 in FIG. 9 may be performed. In the face tracking mode, the processing in S912 may be performed.

How the focus detection region is to be arranged and the size of the region, for example, are not limited to the examples illustrated in FIGS. 4A to 4E and FIG. 17, but may be set without departing from the spirit and scope of the invention.

After the setting of the focus detection region in step S1602 ends, the processing moves to step S1603. In step S1603, the camera control unit 207 determines whether the focus detection region is set at the position of the face detected by the subject detecting unit 210. If so, the processing moves to step S1612. If not, the processing moves to step S1604.

In step S1604, focus detection processing is performed. The focus detection processing to be performed here is performed in the same manner as in the FIG. 6 to FIGS. 8A to 8D.

After the focus detection processing ends in step S1604, the processing moves to step S1605. In step S1605, the camera control unit 207 determines the moving amount of the focus detection region. The moving amount is determined based on the overlap rate of the focus detection region between the last detection of the focusing state and the current detection of the focusing state, as described with reference to FIG. 15. When the overlap rate is 100% to 80%, "no movement" is determined. When the overlap rate is 80% to 50%, "small movement" is determined. When the overlap rate is 50% to 0%, "large movement" is determined. If "large movement" is determined, the processing moves to step S1606. When "small movement" is determined, the processing moves to step S1607. If "no movement" is determined, the processing moves to step S1608. The method for determining the moving amount is not limited to the method described above, but the moving amount may be determined based on a change of coordinates of the center position of the focus detection region between the last focus detection and the current focus detection, for example. A case where there is a movement of the focus detection region corresponds to a case where there is a movement of the focus assist frame in step S1305 in FIG. 13.

Figure 18:
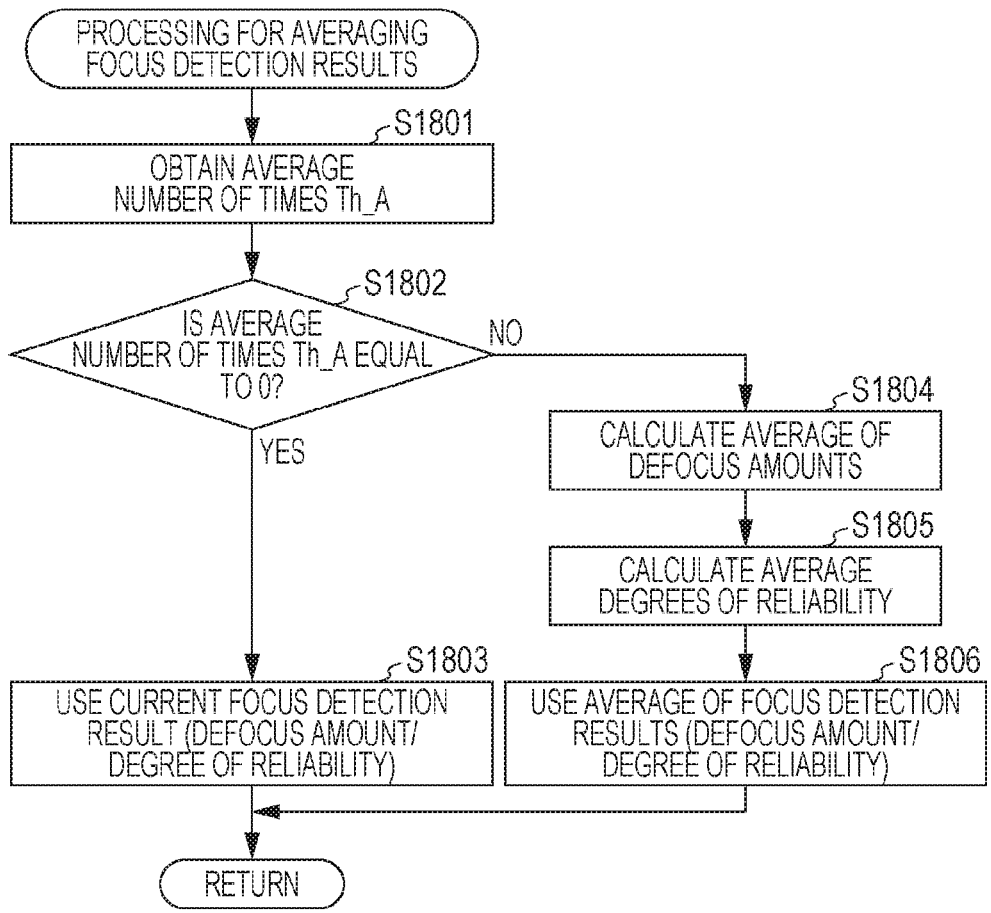
FIG. 18 is a flowchart illustrating processing for averaging focus detection results according to an exemplary embodiment.

In step S1606, step S1607, and step S1068, the camera control unit 207 acquires the average of the focus detection results. The acquired average number of times is used as a parameter for processing. With reference to FIG. 18, the processing for averaging focus detection results to be performed in step S1606, step S1607, and step S1608 in FIG. 16B will be described below.

In step S1801, the camera control unit 207 obtains the average number of times Th_A illustrated in FIG. 15, The processing then moves to step S1802. In step S1802, the camera control unit 207 determines whether the average number of times Th_A is equal to 0 or not. If the average number of times Th_A is equal to 0, the processing moves to step S1803. In step S1803, the current focus detection result (with respect to the defocus amount and the degree of reliability) is set as data to be used for focus assist display, without performing the processing of averaging.

On the other hand, if the average number of times Th_A is not equal to 0, the processing moves to step S1804 where the camera control unit 207 divides the sum total of the defocus amounts obtained by the latest Th_A focus detections by Th_A to calculate the average of the defocus amounts. Next, in step S1805, the camera control unit 207 divides the sum total of degrees of reliability obtained by the latest Th_A focus detections by Th_A to calculate the average of the degree of reliability.

In step S1806, the camera control unit 207 sets the averages of the focus detection results (defocus amount and degree of reliability) obtained in step S1804 and step S1805 as data to be used for focus assist display. After the processing for averaging the focus detection results ends as described above, the processing returns to the processing in FIGS. 16A and 16B.

After the processing in step S1607 and step S1608, the camera control unit 207 in step S1609 performs processing for calculating an angle index indicative of the display position of an angle display part to be used for focus assist display. If the moving amount is determined as "large movement" in step S1605, the processing moves to step S1610 without calculating the angle index after the processing in step S1606 because the angle display part is not to be displayed, as described with reference to FIG. 15.

Figure 19:
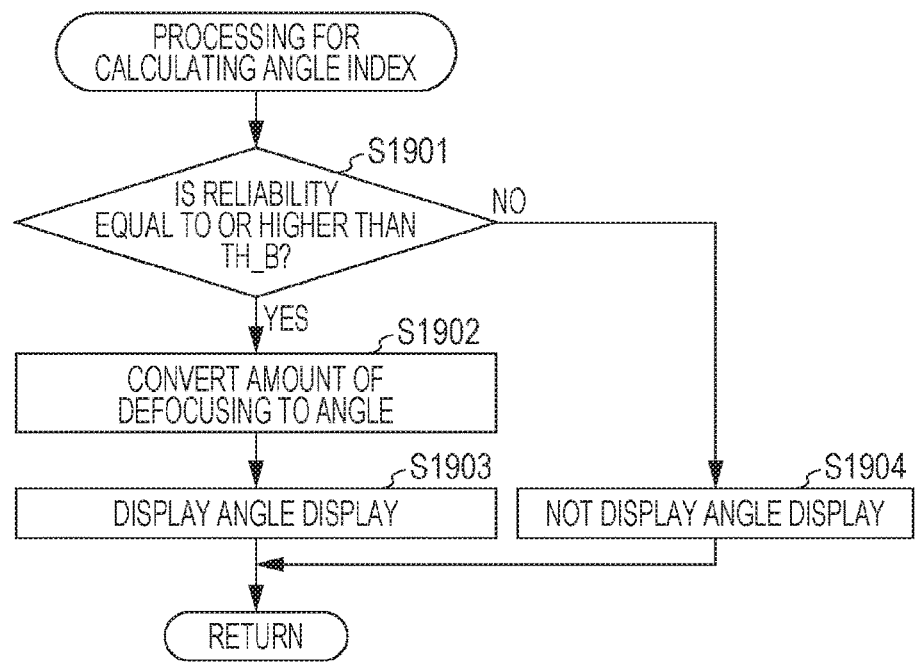
FIG. 19 is a flowchart illustrating processing for calculating an angle index according to an exemplary embodiment.

With reference to FIG. 19, the processing for calculating an angle index to be performed in step S1609 will be described below. In step S1901, the camera control unit 207 determines whether the average of degrees of reliability calculated in step S1607 or step S1608 is equal to or higher than a predetermined threshold value TH_B. This determination is performed for determination of whether an angle index can be calculated by using the average of defocus amounts calculated in step S1607 or step S1608. If the degree of reliability is equal to or higher than the threshold value TH_B, the defocus amount is determined as a reliable value. Then, the processing moves to step S1902. If it is lower than the threshold value TH_B, it is determined that there is a possibility that the defocus amount is not reliable, and the processing moves to step S1904.

In step S1902, the camera control unit 207 converts the defocus amount to an angle. According to an example of the conversion, how many times the defocus amount is larger than the focal point depth where the focal point depth is 1° to calculate the angle index. The method for conversion to an angle is not limited to the calculation method but may include changing in accordance with the sensitivity of a focus ring, for example.

In step S1903, the camera control unit 207 sets a flag indicating that the angle display part is to be displayed. In step S1904, the camera control unit 207 sets a flag indicating that the angle display part is not to be displayed. The processing then moves to step S1610 in FIG. 16.

Figure 20:
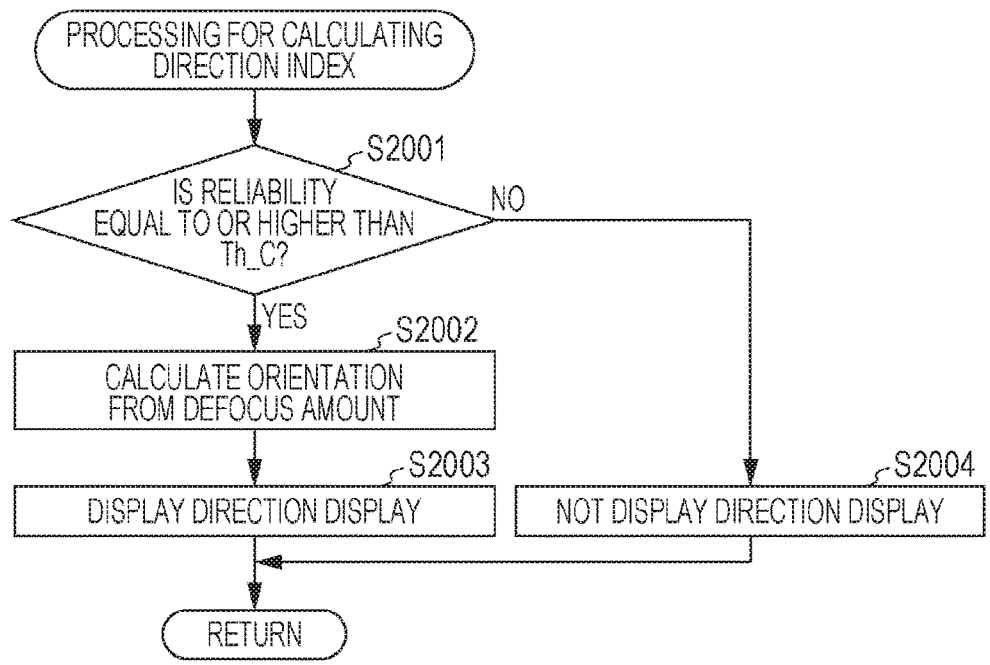
FIG. 20 is a flowchart illustrating processing for calculating a direction index according to an exemplary embodiment.

In step S1610, the camera control unit 207 performs processing for calculating a direction index indicative of the display direction of the direction display part to be used for focus assist display. With reference to FIG. 20, the processing for calculating a direction index to be performed in step S1610 will be described below. In step S2001, the camera control unit 207 determines whether the degree of reliability acquired in step S1606, step S1607, or step S1608 is equal to or higher than a predetermined threshold value TH_C or not. This determination is performed for determining whether a direction index can be calculated by using the defocus amount calculated in step S1606, step S1607, or step S1608. If the degree of reliability is equal to or higher than the threshold value TH_C, the direction calculated from the defocus amount is determined as a reliable value. The processing then moves to step S2002. If it is lower than the threshold value TH_C, it is determined that there is a possibility that the direction calculated from the defocus amount may not be reliable. The processing then moves to step S2004. The threshold value TH_B is a threshold value indicating a higher degree of reliability than the threshold value TH_C.

In step S2002, the camera control unit 207 converts the defocus amount to a direction. As an example, a direction is calculated from the sign of the defocus amount. The camera control unit 207 sets a flag indicating that direction display is to be performed in step S2003 and sets a flag indicating that direction display is not to be performed in step S2004. The processing then moves to step S1611 in FIG. 16.

In step S1611, the camera control unit 207 performs focus assist display processing. This processing may display a part necessary for focus assist display and display an indicator of a focusing state and an indicator of disability of focus detection described with reference to FIGS. 14A to 14C on the display unit 205 based on the flags for the angle display and the direction display and the calculated angle index and direction index.

On the other hand, in a case where a focus detection region is set at a position of the face detected by the subject detecting unit 210 in step S1603, the processing moves to step S1612 where the camera control unit 207 determines the direction of the face. If it is determined that the direction of the face is sideways, the processing moves to step S1613. If it is determined that direction of the face is forward or backward, the processing moves to step S1614.

Figure 21A:
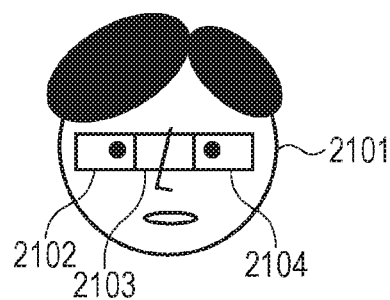
FIGS. 21A and 21B illustrate examples of an additionally set focus detection region for detecting a subject according to an exemplary embodiment.
Figure 21B:
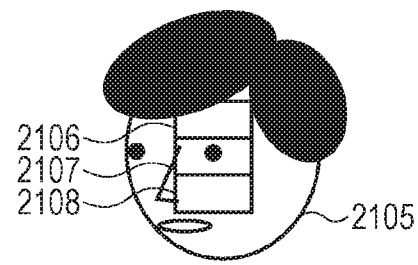

In step S1613 and step S1614, the camera control unit 207 additionally set the focus detection regions. Here, as illustrated in FIGS. 21A and 21B, a focus detection region to be used is additionally set in accordance with the direction of the face. FIG. 21A illustrates a method for setting focus detection region if the direction of the face is forward. Focus detection regions 2102, 2103, and 2104 are set on a face forward 2101. For a face forward, if the focus detection region 2102 is set in step S1602, for example, the focus detection regions 2103 and 2104 are additionally set in horizontally. Additionally setting a focus detection region within a region corresponding to the same face as that for the focus detection region 2102 set in step S1602 can define substantially equal distances between the focus detection region 2102 and the additionally set focus detection regions 2103 and 2104. As described above, a plurality of focus detection regions are laid out horizontally, and focus assist display is thus implemented by using a plurality of focus detection results therefrom.

On the other hand, FIG. 21B illustrates a method for setting focus detection regions if the face is sideways. Focus detection regions 2106, 2107, and 2108 are set on a face sideways 2105. When the face is sideways and if the focus detection region 2107 is set in step S1602, for example, the focus detection region 2106 and 2108 are additionally set vertically. Additionally setting a focus detection region within a region corresponding to the same face as that for the focus detection region 2107 set in step S1602 can define substantially equal distances between the focus detection region 2107 and the additionally set focus detection regions 2106 and 2108. For a face sideways, there is a high possibility that horizontally placed focus detection regions may be off the region of the face, focus detection regions are laid out vertically. As described above, a plurality of focus detection regions are laid out vertically, and focus assist display is implemented by using a plurality of focus detection results therefrom. According to this exemplary embodiment, three focus detection regions are provided. However, it is given for illustration purpose only, and the number of focus detection regions is not limited thereto.

In step S1615, focus detection processing is performed as described above with reference to FIG. 6 to FIG. 8D for each of plurality of focus detection regions. In step S1616, calculation processing is performed based on the plurality of focus detection results acquired in step S1615. More specifically, the camera control unit 207 averages the plurality of focus detection results calculated in step S1615. Averaging is applied according to this exemplary embodiment, a focus detection result to be used may be selected in consideration of the degree of reliability of the focus detection result, for example.

Also in the display control illustrated in FIGS. 16A and 16B, if a focus detection region corresponds to a face (Yes in step S1603), the change operation described with reference to FIG. 13 may be received. In other words, if the change operation is performed through the camera operating unit 208, the processing moves to step S1303 in FIG. 13 where, if a plurality of faces are detected, the processing for changing the main face may be performed.

After processing the focus detection results, the processing described above is performed in step S1609 and step S1610. The camera control unit 207 in step S1611 then performs the focus assist display processing.

Under the display control described with reference to FIGS. 16A and 16B, the stability of the focusing state display can be kept and at the same time the responsiveness can be improved in the focus assist display while manual focus adjustment is being performed. Having described that, according to this exemplary embodiment, the focus assist display is implemented on the display unit 205 included in the camera main body 20, the focus assist display may be implemented by using information obtained from the camera main body 20 on a display unit separate from the camera main body 20.

Second Exemplary Embodiment

Next, a second exemplary embodiment will be described with reference to FIG. 11 and FIGS. 12A and 12B. This exemplary embodiment is different from the first exemplary embodiment in that a setting for focus assist display is changed based on the depth of field. Like numbers refer to like parts in the first and second exemplary embodiments, and the repetitive description will be omitted.

Figure 11:
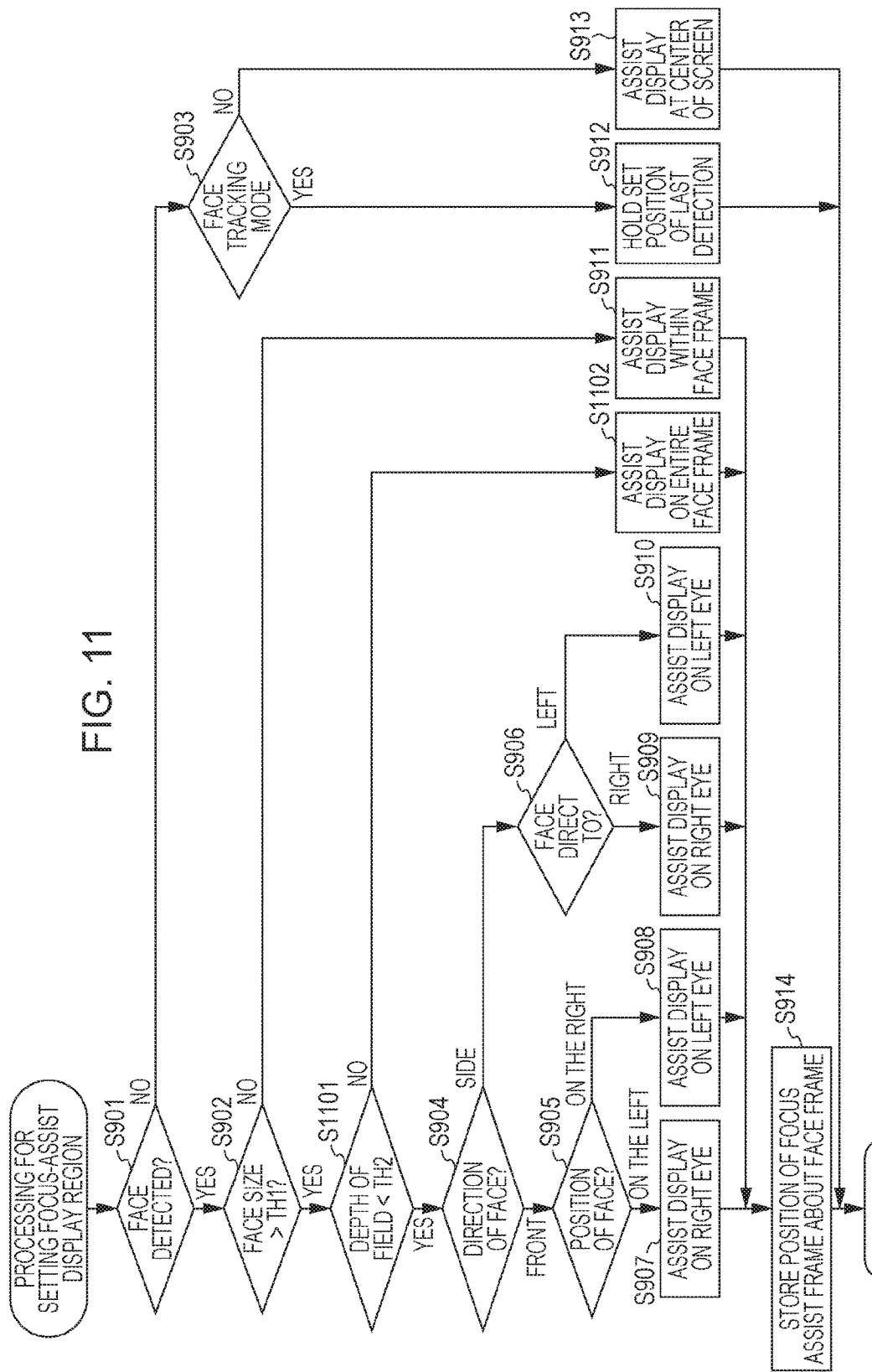
FIG. 11 is a flowchart illustrating processing for setting a focus assist display region according to a second exemplary embodiment.
Figure 12A:
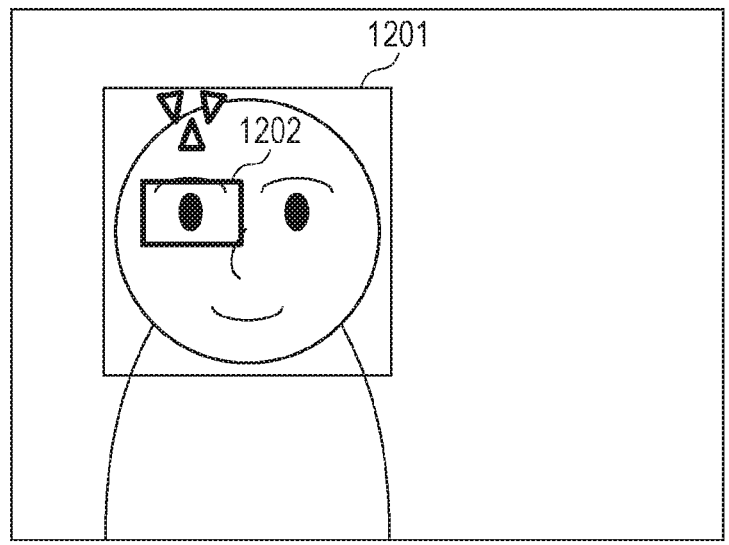
FIGS. 12A and 12B illustrates examples of a displayed focus assist frame according to the second exemplary embodiment.
Figure 12B:
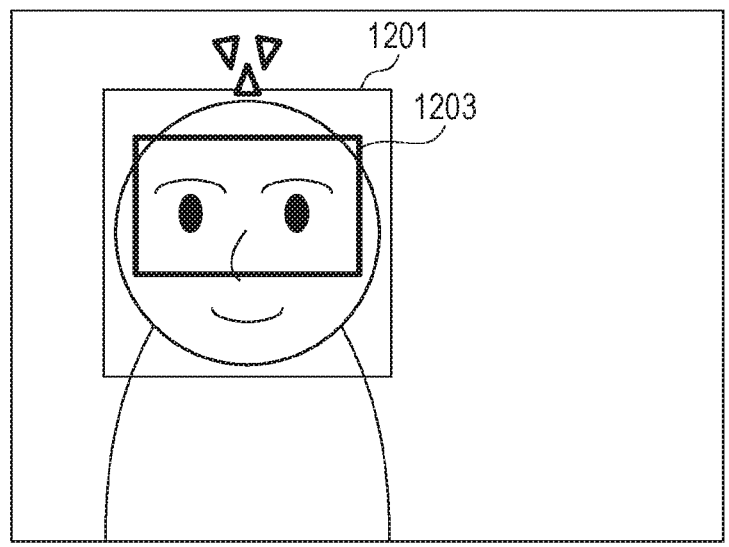

FIG. 11 is a flowchart illustrating a flow of processing for setting a focus assist display region according to this exemplary embodiment, instead of FIG. 9. According to this exemplary embodiment, the size of a focus assist display region is changeable.

First of all, in step S902, if the size of the detected face is larger than a threshold value TH1, the processing moves to step S1101. In step S1101, the camera control unit 207 determines whether the depth of field is smaller than a threshold value TH2 or not. If the depth of field is smaller than the threshold value TH2, the processing moves to step S904. Then, the same processing as that in step S901 is performed subsequently.

On the other hand, if the depth of field is equal to or larger than the threshold value TH2, the processing moves to step S1102 where a focus assist frame is set based on the entire face frame. For example, a focus assist frame is set in a region substantially equal to the corresponding face frame or in a region having a size equal to or larger than a predetermined ratio within the face frame. After the focus assist frame is set in step S1102, the processing moves to step S914 where the same processing as in FIG. 9 is performed. If it is determined that the size of the face detected in step S902 is equal to or larger than the threshold value TH1, the processing in step S1102 may be performed.

According to this exemplary embodiment as described above, even if the size of the detected face is larger than the threshold value TH1 and if the depth of field is equal to or larger than a threshold value, the focus assist display is implemented based on the entire face frame. The reason will be described why the setting of a focus assist frame is changed based on the depth of field.

If the depth of field is shorter than the length in depth of the detected face (such as the tip of the nose to the back of the head), there is a high possibility that the difference in focusing between parts of the face may be identified. For example, when the direction of the face is rightward, a difference in distance to the camera between the left eye and the right eye is equal to the depth of the face. Thus, if the depth of field is shorter than the length of the depth of the face, the difference in focusing between the left eye and the right eye may be visually recognizable. Therefore, a focus assist frame is set on the right eye. FIG. 12A illustrates a state in which a focus assist frame 1202 is set in a region corresponding to the right eye within a face frame 1201.

On the other hand, if the depth of field is longer than the length of the depth of the face, there is a high possibility that the difference in focusing between parts of the face may not be identified. For example, when the direction of the face is rightward and is sideways and if the depth of field is longer than the length of the depth of the face, the difference in focusing between the left eye and the right eye may not be visually recognized. Accordingly, by giving priority to the detection of a defocus amount with higher precision, a focus assist frame 1203 may be set based on the entire face frame 1201, as illustrated in FIG. 12B.

According to this exemplary embodiment as described above, the setting of the focus assist frame is changed based on the depth of field. More specifically, when the depth of field is shorter, a focusing state is detected for display from a smaller region for precise focus adjustment. On the other hand, when the depth of field is longer, a focusing state is detected for display from a larger region by giving priority to the precision of focus detection. By performing the processing, focus assist display with higher convenience can be implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display control apparatus comprising:
a focus detection unit configured to detect a focusing state based on a signal generated by an image pickup unit;
a setting unit configured to set a first region within an image generated by the image pickup unit;
a display control unit configured to control display of an index superimposed on the image, the index representing the focusing state detected by the focus detection unit;
a receiving unit configured to receive a predetermined operation performed by a user,
wherein the setting unit is configured to change a position of the first region based on the predetermined operation, and
wherein, in a case where a subject at a same distance is captured (1) when an amount of change in a position of the first region based on the predetermined operation is a first amount as well as (2) when the amount of change is a second amount smaller than the first amount, and in a case where a distance to the subject captured at the position of the first region before the position of the first region is changed is different from a distance to the subject captured at the position of the first region after the position of the first region is changed, the display control unit is configured to control the display of the index so that a change in the display of the index is greater when the amount of change is the first amount.

2. The display control apparatus according to claim 1, wherein the focusing state to be detected by the focus detection unit includes a defocus amount, and a direction to an in-focus position, and the display of the index includes first and second indexes representing positions that change based on the defocus amount, and a third index representing the in-focus position.

3. The display control apparatus according to claim 2, wherein the change in the display of the index is an amount of change in an angle of the first and second indexes.

4. The display control apparatus according to claim 1, wherein an amount of change in the position of the first region is determined based on an overlap rate of the first region before the position of the first region is changed and the first region after the position of the first region is changed.

5. The display control apparatus according to claim 1, wherein the focusing state includes a defocus amount and a direction to an in-focus position, and in a case where the index is displayed in a first display form representing the defocus amount and the direction to the in-focus state as a display form of the index, the display control unit is configured to display the index based on an average of results of detecting the focusing state a plurality of times by the focus detection unit.

6. The display control apparatus according to claim 5, wherein in a case where the index is displayed in the first display form, the display control unit is configured to average the results of detecting the focusing state a smaller number of times in a case where the amount of change in a position of a focus detection region received via the receiving unit is larger than a second amount than in a case where the amount of change is equal to or smaller than the second amount.

7. The display control apparatus according to claim 1, wherein it is determined that the defocus amount is available, the display control unit is configured to change the display of the index based on the amount of change in the position of the focus detection region received via the receiving unit.

8. An image pickup apparatus comprising:
the display control apparatus according to claim 1; and
the image pickup unit,
wherein the image pickup unit includes a plurality of pixels including a plurality of photoelectric converters for one microlens and is configured to photoelectrically convert a luminous flux incident via an imaging optical system and output a pair of image signals.

9. A control method for controlling a display control apparatus configured to display an image based on a signal generated by an image pickup unit on a display unit, the control method comprising:
   detecting a focusing state based on a signal generated by the image pickup unit;
   setting a first region within an image generated by the image pickup unit;
   controlling display of an index superimposed on the image, the index representing the focusing state detected in the detecting; and
   receiving a predetermined operation performed by a user,
      wherein, in the setting, a position of the first region is changed based on the predetermined operation, and
      wherein, in a case where a subject at a same distance is captured (1) when an amount of change in a position of the first region based on the predetermined operation is a first amount as well as (2) when the amount of change is a second amount smaller than the first amount, and in a case where a distance to the subject captured at the position of the first region before the position of the first region is changed is different from a distance to the subject captured at the position of the first region after the position of the first region is changed, the display of the index is controlled in the controlling so that a change in the display of the index is greater when the amount of change is the first amount.

10. A storage medium storing a program for causing a computer to execute the control method according to claim 9.

11. A display control apparatus comprising:
   a focus detection unit configured to detect a focusing state based on a pair of image signals generated by an image pickup unit configured to receive and photoelectrically convert a luminous flux incident via an imaging optical system including a focusing lens;
   a region setting unit configured to set a first region in which the focus detection unit detects the focusing state;
   a display control unit configured to control display so that a first display representing a region corresponding to the first region and a second display representing an index based on the focusing state detected by the focus detection unit in the first region are superimposed on an image;
   an obtaining unit configured to obtain information about a predetermined subject; and
   a receiving unit configured to receive a predetermined operation performed by a user,
   wherein the region setting unit is configured to set the first region to a predetermined region in a case where the obtaining unit has not obtained the information about the predetermined subject,
   wherein the region setting unit is configured to set the first region based on the information about the predetermined subject in a case where the obtaining unit has obtained the information about the predetermined subject,
   wherein the region setting unit is configured to set a position of the first region based on the information about the predetermined subject in a case where designation of a position of a focus detection region is received via the receiving unit, and
   wherein the focusing state to be detected by the focus detection unit includes a defocus amount and a direction to an in-focus state, and the first display includes first and second indexes representing positions that change based on the defocus amount and a third index representing the in-focus position.

12. The display control apparatus according to claim 11, wherein the predetermined subject includes a plurality of feature regions, and
   wherein the region setting unit is configured to set the first region based on a position of one of the feature regions in a case where a size of the predetermined subject is larger than a first threshold value.

13. The display control apparatus according to claim 11, wherein the region setting unit is configured to set the first region based on a position of a feature region at a position far from a center of the image among the feature regions or a position of a feature region at a position on a closest side among the feature regions.

14. The display control apparatus according to claim 11, wherein in a case where the obtaining unit has obtained information about a plurality of predetermined subjects, the region setting unit is configured to set the first region based on information about one of the plurality of predetermined subjects, and to change the predetermined subject for which the first region is to be set based on the designation of the focus detection region received via the receiving unit.

15. The display control apparatus according to claim 11, wherein the predetermined subject is a face, and a feature region is an eye region.

16. A control method for controlling a display control apparatus configured to display an image based on a signal generated by an image pickup unit on a display unit, the control method comprising:
   detecting a focusing state based on a pair of image signals to be generated by the image pickup unit;
   setting a first region in which the focusing state is to be detected in the detecting;
   controlling display so that a first display representing a region corresponding to the first region and a second display representing an index based on the focusing state detected by the focus detection unit in the first region are superimposed on an image; and
   obtaining information about a predetermined subject;
   wherein the first region is set to a predetermined region in the setting in a case where the information about the predetermined subject has not been obtained in the obtaining,
   wherein the first region is set based on the information about the predetermined subject in the setting in a case where the information about the predetermined subject has been obtained in the obtaining,
   wherein a position of the first region is changed based on the information about the predetermined subject in the setting in a case where a predetermined operation has been performed via an operation member, and
   wherein the focusing state to be detected in the detecting includes a defocus amount and a direction to an in-focus state, and the second display includes first and second indexes representing positions that change based on the defocus amount and a third index representing the in-focus position.

17. A storage medium storing a program for causing a computer to execute the control method according to claim 16.

* * * * *